US012733038B2

(12) United States Patent
Rune et al.

(10) Patent No.: US 12,733,038 B2
(45) Date of Patent: Sep. 8, 2026

(54) SWITCHING RANDOM ACCESS TRIGGERED BY BACKOFF

(71) Applicant: Telefonaktiebolaget LM Ericsson (publ), Stockholm (SE)

(72) Inventors: Johan Rune, Lidingö (SE); Jan Christoffersson, Luleå (SE); Henrik Enbuske, Stockholm (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 813 days.

(21) Appl. No.: 17/797,459

(22) PCT Filed: Feb. 11, 2021

(86) PCT No.: PCT/EP2021/053391

§ 371 (c)(1),
(2) Date: Aug. 4, 2022

(87) PCT Pub. No.: WO2021/160770

PCT Pub. Date: Aug. 19, 2021

(65) Prior Publication Data

US 2023/0083993 A1 Mar. 16, 2023

Related U.S. Application Data

(60) Provisional application No. 62/976,264, filed on Feb. 13, 2020.

(51) Int. Cl.
*H04W 74/0833* (2024.01)
*H04W 74/0836* (2024.01)

(52) U.S. Cl.
CPC .... *H04W 74/0833* (2013.01); *H04W 74/0836* (2024.01)

(58) Field of Classification Search
CPC ..................... H04W 74/0833; H04W 74/0836
See application file for complete search history.

(56) References Cited

U.S. PATENT DOCUMENTS

2022/0330118 A1* 10/2022 Kim ...................... H04W 80/02
2023/0062577 A1* 3/2023 Rudolf ................ H04W 74/002

FOREIGN PATENT DOCUMENTS

EP 3 697 167 A1 8/2020
KR 20200083928 A * 7/2020 ........ H04W 74/0833
WO WO-2020218894 A1 * 10/2020 ........... H04L 1/1812

OTHER PUBLICATIONS

ITRI: RA variables for 2 step RACH fallback procedure:, 3GPP Draft; R2-1915069. Reno, USA; Nov. 18, 2019-Nov. 22, 2019 (Year: 2019).*

(Continued)

*Primary Examiner* — Sujoy K Kundu
*Assistant Examiner* — Samuel Dilan Rutnam
(74) *Attorney, Agent, or Firm* — Baker Botts L.L.P.

(57) ABSTRACT

A method by a wireless device includes transmitting, to a network node, a first message to initiate a 2-step Random Access (RA) procedure to access a network. After transmitting the first message, the wireless device receives, from the network node, a second message including at least one parameter indicating that the wireless device is to wait a period of time before reattempting to access the network using the 2-step RA procedure. Based on the parameter indicating that the wireless device is to wait a period of time before reattempting to access the network using the 2-step RA procedure, the wireless device attempts to access the network using a 4-step RA procedure without waiting for the period of time.

19 Claims, 18 Drawing Sheets

(56) References Cited

OTHER PUBLICATIONS

PCT Notification of Transmittal of the International Search Report and the Written Opinion of the International Searching Authority, or the Declaration issued for International application No. PCT/EP2021/053391—May 14, 2021.
3GPP TSG-RAN WG2 #107; Prague, Czech Republic; Source: NEC; Title: Details on fallback mechanisms (R2-1909147)—Aug. 26-30, 2019.
3GPP TSG-RAN WG2 Meeting #108; Reno, USA; Source: Huawei, HiSilicon; Title: Further Discussions on Fallback Procedure for 2-step RACH (R2-1916018)—Nov. 18-22, 2019.
3GPP TSG RAN Meeting #82; Sorrento, Italy; Source: ZTE Corporation, Sanechips; Title: New work item: 2-step RACH for NR (RP-182894)—Dec. 10-13, 2018.
Examination Report issued by Intellectual Property India for Application Serial No. 202247051277—Sep. 4, 2024.
3GPP TSG RAN WG2 Meeting #94; Nanjing, China, May 23-27, 2016; Agenda item: 9.5.1; Source: Intel Corporation; Title: Mobility and beam support in NR (R2-163579).
EPO Communication Pursuant to Article 94(3) EPC issued for Application No. 21 705 904.7-1215—Dec. 18, 2023.
3GPP TSG-RAN WG2 Meeting #108; Reno, USA, Nov. 18-22, 2019; Agenda Item: 6.13.2; Source: ITRI; Title: RA variables for 2-step RACH fallback procedure (R2-1915069).

* cited by examiner

PUSCH Occasion

PUSCH RU: $\{DMRS_{k,0}\},\{DMRS_{k,1}\}$

SWITCHING RANDOM ACCESS TRIGGERED BY BACKOFF

PRIORITY

This nonprovisional application is a U.S. National Stage Filing under 35 U.S.C. § 371 of International Patent Application Serial No. PCT/EP2021/053391 filed Feb. 11, 2021, entitled "Switching Random Access Triggered by Backoff" which claims priority to U.S. Provisional Patent Application No. 62/976,264 filed Feb. 13, 2020, both of which are hereby incorporated by reference in their entirety.

TECHNICAL FIELD

The present disclosure relates, in general, to wireless communications and, more particularly, systems and methods for switching random access procedures when triggered by backoff.

BACKGROUND

FIG. 1 illustrates a 4-step Random Access (RA) Procedure as disclosed in Release 15. In this approach, the user equipment (UE) detects synchronization signals (SS) and decodes the broadcasted system information. The UE then transmits a Physical Random Access Channel (PRACH) preamble (Msg1) on the uplink. The gNodeB (gNB) replies with a Random Access Response (RAR) (Msg2). The UE then transmits a UE identification (Msg3) on Physical Uplink Shared Channel (PUSCH) using an uplink grant (i.e. allocation of uplink transmission resources).

The UE transmits the Msg3 after receiving a timing advance command in the RAR, allowing PUSCH to be received with a timing accuracy within the cyclic prefix (CP). Without this timing advance, a very large CP would be needed in order to be able to demodulate and detect PUSCH, unless the system is applied in a cell with very small distance between UE and eNodeB (eNB). Since New Radio (NR) will also support larger cells with a need for providing a timing advance to the UE, the 4-step approach is needed for random access (RA) procedure.

In Release 15 in $3^{rd}$ Generation Partnership Project (3GPP), preamble grouping is a concept that allows the UE to signal to the network by means of PRACH preambles that it has a payload that is larger than a configured threshold. This is then used by the network to schedule the UE with larger resources for Msg3. The UE may only signal this if the pathloss with the serving cell is lower than a configured threshold.

In the 4-step procedure, the gNB may signal back off in the RAR. This is indicated by a Medium Access Control (MAC) subheader with Back off Indicator which consists of five header fields E/T/R/R/BI as discussed in 3GPP TR 38.321. If a UE receives a RAR with the E/T/R/R/BI MAC subheader but no 'MAC subPDU(s) with RAPID and MAC RAR' with RAPID matching its preamble transmission, the UE will for a random time between 0 and a time indicated by the BI field before doing a new preamble transmission attempt, i.e. return to Random Access Resource selection.

A 2-step Random Access Channel (RACH) work item has been approved in RAN1 #82 plenary meeting [1] for Release 16 in 3GPP. See, RP-182894, New work item proposal 2 step RACH for NR, ZTE, Sorrento, Italy, Dec. 10-13, 2018. FIG. 2 illustrates the RA Procedure for completing initial access in only two steps. Specifically, as depicted in FIG. 2 and in a first step, the UE sends a message A (MsgA) including random access preamble together with higher layer data such as Radio Resource Control (RRC) connection request possibly with some small payload on PUSCH (denoted "msgA PUSCH"). In a second step, the gNB sends a response called message B, which may described as a modified RAR, including UE identifier assignment, timing advance information, and contention resolution message, etc. In addition, the message B (MsgB) may contain a higher layer part. Similar to a RAR, a MsgB may contain responses to multiple MsgAs, and thus to multiple UEs, but the optional higher layer part can only pertain to one of the responses (i.e. to one of the MsgAs/UEs). If a response in a MsgB does not have an associated higher layer part, this will be sent in a separate subsequent message, e.g. an RRC message, on the Physical Downlink Shared Channel (PDSCH).

The MsgB is a response to MsgA, which may contain contention resolution message(s), fallback indication(s) to schedule Msg3 transmission, and backoff indication. The latest 3GPP agreements for MsgB are from RAN2 #107bis and RAN2 #108.

From the agreement, there is one "E" bit and two "T" bits in the MAC subheader for backoff. Assuming that the BI field will still be 4 bits as for the 4-step procedure there will still be one "R" bit in the subheader.

The reason for the network telling the UE to perform back off is due to high load. This high load may cause the gNB not being able to decode preambles or MsgA PUSCH or not being able to process the random access attempts. For example, even a relative moderate number of simultaneous PUSCH transmissions on the same PUSCH resource may be difficult for the gNb to decode. At the same time, the same number of simultaneous 4-step preamble transmissions might be easily handled. Hence, the load situation may be different on the 2-step resources compared to the 4-step resources. When the system experiences high load will depend on the mutual or relative configuration of resources for both 2-step and 4-step. There will always be situations when there is high load on e.g. 2-step but not on 4-step, or vice versa.

Back off signaling using MsgB serves the purpose of reducing the load on 2-step resources (both PRACH and PUSCH) by ordering the UEs to retry after a random back off time. Since the 2-step RA will be used by all UEs that fulfill the conditions for using the 2-step RA the load on the 2-step resources can be expected to be high. At the same time, the 2-step resources are expensive to configure which further increases the risk of high load since the 2-step configuration can be expected to be slim not to waste resources.

The 2-step RA and 4-step RA can coexist in a cell by using separate RACH occasions or shared RACH occasions. A RACH occasion (RO), also called PRACH occasion, is an occurrence in time and frequency of uplink transmission resources configured for transmission of PRACH preambles. With separate ROs, each RO is only configured for either 2-step RA or 4-step RA. With shared ROs, each RO is configured for both 2-step RA and 4-step RA (where the two RA types are distinguished by the PRACH preamble). It is possible to configure all ROs to support 4-step RA, while a subset of them are shared ROs, i.e. having both 4-step and 2-step support, while the remaining ROs are 4-step RA only ROs (i.e. they are only configured for 4-step RA). In a shared RO, the PRACH preambles used for 4-step RA are referred to as "4-step preambles", "4-step RA preambles" or "4-step PRACH preambles", while the PRACH preambles used for 2-step RA are referred to as “2-step preambles”, “2-step RA preambles” or “2-step PRACH preambles.

When 2-step RA and 4-step RA are configured in a cell, the UE selects 2-step RA if the UE's perceived channel quality (measured as Reference Symbol Received Power (RSRP)) is above a configured threshold (tentatively called “rsrp-ThresholdTwoStepRA” or just “rsrp-Threshold”).

The network can configure the maximum number of 2-step RA attempts a UE can perform before concluding that the 2-step RA has failed. When that happens, the UE may switch to 4-step RA (provided that 4-step RA resources are configured in the cell) and attempt to access the network using 4-step RA.

Note that in this context a distinction exists between a fallback to 4-step RA and switching to 4-step RA. The former is triggered by a fallbackRAR Medium Access Control (MAC) subPDU in MsgB (as described above), while the latter is performed by the UE after failing to access the network using 2-step RA.

When a UE switches from 2-step RA to 4-step RA, it is preferable that the UE can get the same size of the PUSCH allocation for Msg3 as it had for MsgA PUSCH so that the MsgA PUSCH can readily be retransmitted in the form of a Msg3. Otherwise, the UE has to discard the content of the buffer holding the MsgA PUSCH, construct, or build, a new Msg3 and put it in the buffer in place of the discarded MsgA PUSCH. This process is referred to as “re-building”. Depending on the UE implementation, re-building can be a complex operation and some UEs may implement support for re-building (but would for instance instead restart the random access preparations from scratch), while it may be a rather simple operation for other UEs.

A feature inherited from the 4-step RA procedure is RA prioritization. According to RAN2 #107bis it has been agreed that for 2-step CBRA, RA prioritization is supported at least for handover and beam failure recovery. Additionally, RA prioritization for 2-step CBRA is controlled by network RA prioritization parameters that are separately configured for 2-step CBRA and 4-step CBRA. ra-Prioritization2Step is optionally added to BeamFailureRecoveryConfig Information Element (IE) and RACH-ConfigDedicated IE.

If a RA procedure is prioritized, it means that specific parameters are configured, e.g. msgA-PowerRampingStepHighPriority and msgA-ScalingFactorBI, which enables a faster power ramping and shorter back off for msgA compared to the normal configuration.

When introducing the 2-step random access procedure, the PUSCH in MsgA (generally referred to as “MsgA PUSCH”) can be transmitted immediately after an associated PRACH preamble. And the MsgA PUSCH resources are cell-specifically reserved at least for the transmission of MsgA PUSCH in conjunction with initial access.

MsgA PUSCH may be transmitted in T/F resource locations referred to as PUSCH occasions (PO). FIG. 3 illustrates a PUSCH occasion. A set of resources containing multiple PUSCH occasions is defined and may be referred to as a msgA PUSCH set, where:

- A PUSCH resource unit (‘PUSCH RU’) is defined as the PUSCH occasion (‘PO’) and Demodulation Reference Signal (DMRS) port/DMRS sequence used for MsgA payload transmission.
  - Allows Multi-User, Multiple-Input, Multiple-Output (MU-MIMO) reception
  - Allows multiple UEs to share the same PUSCH PO, while their respective MsgA PUSCH can still be decoded by the receiving gNB
  - Each PUSCH RU corresponds to a PRACH preamble
  - Support of both DMRS port & sequence or just one is for future study
- Each PUSCH Occasion (PO) occupies a contiguous set of subcarriers and symbols
  - If for each PO there is a guard band (in Physical Resource Blocks (PRBs)) or guard time is for future study
- The time and frequency domain resource allocations of the PUSCH POs use the associated RACH occasion as reference
- A MsgA PUSCH set occurs periodically with the same period as the associated RACH occasions and has a known length in symbols and position in frequency
- A MsgA PUSCH set can contain multiple POs contiguous in frequency and in time (including guard band or period if defined)
  - Support for frequency hopping is for future study PUSCH RUs have ‘K’ Physical Resource Blocks (PRBs). K can vary, and a given PRB can contain PUSCH RUs with different size. K is identified by which preamble is used. If a PRB contains PUSCH RUs with different size K, DMRS identifiers (DMRS IDs) are a function of size; Total # DMRS=(# PO Sizes)×(PUSCH RUs per PO). UE can randomly select PUSCH RU index ‘n’ out of the configured set. FIG. 4 illustrates a MsgA PUSCH set comprising a set of PUSCH resource units.

The use of Bandwidth Parts (BWPs) has been standardized in 3GPP Release 15 for NR. The reasons for using BWPs are that some UEs might not be able to use the entire BW, in which case they are assigned a smaller BWP which they are capable of handling. Another reason is for battery savings. A UE may be assigned a narrower BWP to reduce the needed energy for reception and transmission. Yet another reason could be for load balancing when the UEs do not need the entire BW to meet the bit rate requirements.

Each UE is assigned with at least an initial BWP (same for all UEs, narrow enough for all UEs to handle) and a default BWP. The default BWP may be the same as the initial BWP but may also be different (i.e. different UEs will typically have different default BWPs). In addition to initial and default BWP, the UE can be configured with additional BWPs. It has been agreed that a UE can have up to four downlink (DL)/uplink (UL) BWPs. The BWPs may be overlapping. An important agreement is also that at any point in time, only one BWP is active for a specific UE.

The UE is configured with BWPs using RRC signaling (except the initial which is signaled in the system information block (SIB)) and switching between BWPs is done by Downlink Control Signaling (DCI) on the Physical Downlink Control Channel (PDCCH). There is also a possibility to switch to the default BWP when the bwp-InactivityTimer expires or when RA is initiated if the active BWP does not have any RA resources.

A BWP may also be configured with PRACH occasions, allowing the UE to initiate a RA procedure on the BWP. The configuration of PRACH occasions on a BWP is not mandatory except on the initial BWP, where it is always present to allow initial access. Also for Physical Uplink Control Channel (PUCCH) a BWP may or may not have PUCCH resources configured. The reason for not having a PUCCH configured is that it occupies resources which will lead to overhead (especially in configured but not active BWPs).

The BWP operation is specified in 3GPP TS 38.321 section 5.15, which specifies that a Serving Cell may be configured with one or multiple BWPs. The maximum number of BWP per Serving Cell is specified in 3GPP TS 38.213.

The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signalling, or by the MAC entity itself upon initiation of Random Access procedure. Upon RRC (re-)configuration of firstActiveDownlinkBWP-Id and/or firstActiveUplinkBWP-Id for SpCell or activation of an Secondary Cell (SCell), the DL BWP and/or UL BWP indicated by firstActiveDownlinkBWP-Id and/or firstActiveUplinkBWP-Id respectively (as specified in 3GPP TS 38.331) is active without receiving PDCCH indicating a downlink assignment or an uplink grant. The active BWP for a Serving Cell is indicated by either RRC or PDCCH (as specified in 3GPP TS 38.213). For unpaired spectrum, a DL BWP is paired with a UL BWP, and BWP switching is common for both UL and DL.

For each activated Serving Cell configured with a BWP, the MAC entity shall:

1. if a BWP is activated:
   - transmit on Uplink Shared Channel (UL-SCH) on the BWP;
   - transmit on RACH on the BWP, if PRACH occasions are configured;
   - monitor the PDCCH on the BWP;
   - transmit PUCCH on the BWP, if configured;
   - report Channel State Information (CSI) for the BWP;
   - transmit SRS on the BWP, if configured;
   - receive DL-SCH on the BWP;
   - (re-)initialize any suspended configured uplink grants of configured grant Type 1 on the active BWP according to the stored configuration, if any, and to start in the symbol according to rules in subclause 5.8.2.
2. if a BWP is deactivated:
   - not transmit on UL-SCH on the BWP;
   - not transmit on RACH on the BWP;
   - not monitor the PDCCH on the BWP;
   - not transmit PUCCH on the BWP;
   - not report CSI for the BWP;
   - not transmit Sounding Reference Signal (SRS) on the BWP;
   - not receive DL-SCH on the BWP;
   - clear any configured downlink assignment and configured uplink grant of configured grant Type 2 on the BWP;
   - suspend any configured uplink grant of configured grant Type 1 on the inactive BWP.

Agreements for 2-step RA on BWPs are RAN1 #99 Agreements:

For RRC_CONNECTED state

- Confirm the working assumption that the preamble group based method as defined for RRC_IDLE/INACTIVE state is reused for the indication of multiple configurations.
- The number of msgA PUSCH configuration(s) can be different from that in RRC RRC_IDLE/INACTIVE state.
- PRACH configuration(s) and msgA PUSCH configuration(s) are both cell specific and configured per BWP
- The number of preamble groups for 2-step RACH should be aligned with the number of msgA PUSCH configurations in a BWP If the active UL BWP and the initial UL BWP have same Sub Carrier Spacing (SCS) and same CP length and the active UL BWP includes all RBs of the initial UL BWP, or the active UL BWP is the initial UL BWP,

- The preamble grouping and msgA PUSCH configurations are left to gNB implementation
  - Note: Preamble grouping is configured per UL BWP
  - Note: for this overlapped UL BWP it could be up to 4 PUSCH configurations from gNB perspective
  - Note: for this overlapped UL BWP it could be up to 2 PUSCH configurations from UE perspective Preamble grouping in 2-step RA works slightly differently compared to 4-step RA. The reason for this is that in 4-step RA the preamble grouping is there to allow for UE to signal to the network that it wants to be scheduled with a larger than normal UL grant, while in 2-step RA the msgA PUSCH is already pre-configured and is not "scheduled". This means that there is a pre-configured association between the preamble group and the MsgA PUSCH configuration.

Certain problems exist. For example, when a UE does not receive any response (in the form of a successRAR or fallbackRAR MAC subPDU) but finds a Backoff Indicator in the msgB, the UE's access to the network will be delayed without consideration of the load on the resources for different RA types.

SUMMARY

Certain aspects of the present disclosure and their embodiments may provide solutions to these or other challenges. For example, according to certain embodiments, a proposed solution includes configuring a user equipment (UE) or other wireless device to be allowed to ignore the Backoff Indicator in a msgB of a 2-step Random Access (RA) procedure, and, thus, save time under certain circumstances and conditions.

According to certain embodiments, a method by a wireless device includes transmitting, to a network node, a first message to initiate a 2-step Random Access (RA) procedure to access a network. After transmitting the first message, the wireless device receives, from the network node, a second message including at least one parameter indicating that the wireless device is to wait a period of time before reattempting to access the network using the 2-step RA procedure. Based on the parameter indicating that the wireless device is to wait a period of time before reattempting to access the network using the 2-step RA procedure, the wireless device attempts to access the network using a 4-step RA procedure without waiting for the period of time.

According to certain embodiments, a wireless device includes processing circuitry configured to transmit, to a network node, a first message to initiate a 2-step RA procedure to access a network. After transmitting the first message, the processing circuitry receives, from the network node, a second message including at least one parameter indicating that the wireless device is to wait a period of time before reattempting to access the network using the 2-step RA procedure. Based on the parameter indicating that the wireless device is to wait a period of time before reattempting to access the network using the 2-step RA procedure, the processing circuitry is configured to attempt to access the network using a 4-step RA procedure without waiting for the period of time.

According to certain embodiments, a method by a network node includes receiving, from a wireless device, a first message to initiate a 2-step RA procedure to access a network. The network node transmits, to the wireless device, a second message including least one parameter indicating that the wireless device is to wait a period of time before reattempting to access the network using the 2-step RA procedure. Before an expiration of the period of time that the wireless device is to wait, the network node receives a third message, from the wireless device, to initiate a 4-step RA procedure to access the network.

According to certain embodiments, a network node includes processing circuitry configured to receive, from a wireless device, a first message to initiate a 2-step RA procedure to access a network. The processing circuitry is configured to transmit, to the wireless device, a second message including least one parameter indicating that the wireless device is to wait a period of time before reattempting to access the network using the 2-step RA procedure. Before an expiration of the period of time that the wireless device is to wait, the processing circuitry is configured to receive a third message, from the wireless device, to initiate a 4-step RA procedure to access the network.

Certain embodiments may provide one or more of the following technical advantages. For example, one technical advantage may be that where the relative random access load is uneven for different RA types, certain embodiments may speed up a UEs access to the network without further loading the strained resources.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
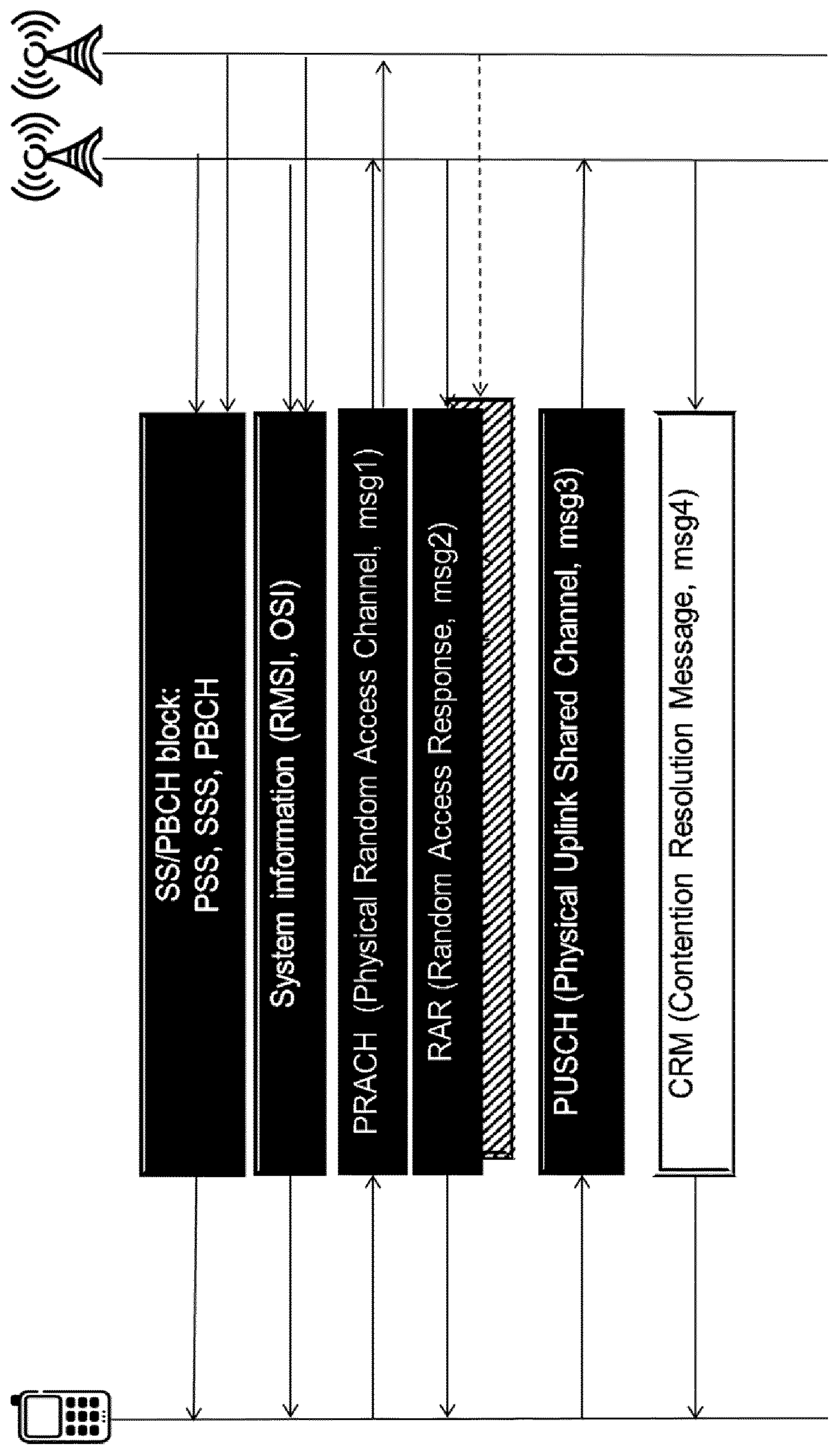
FIG. 1 illustrates a 4-step Random Access (RA) Procedure as disclosed in Release 15.
Figure 2:
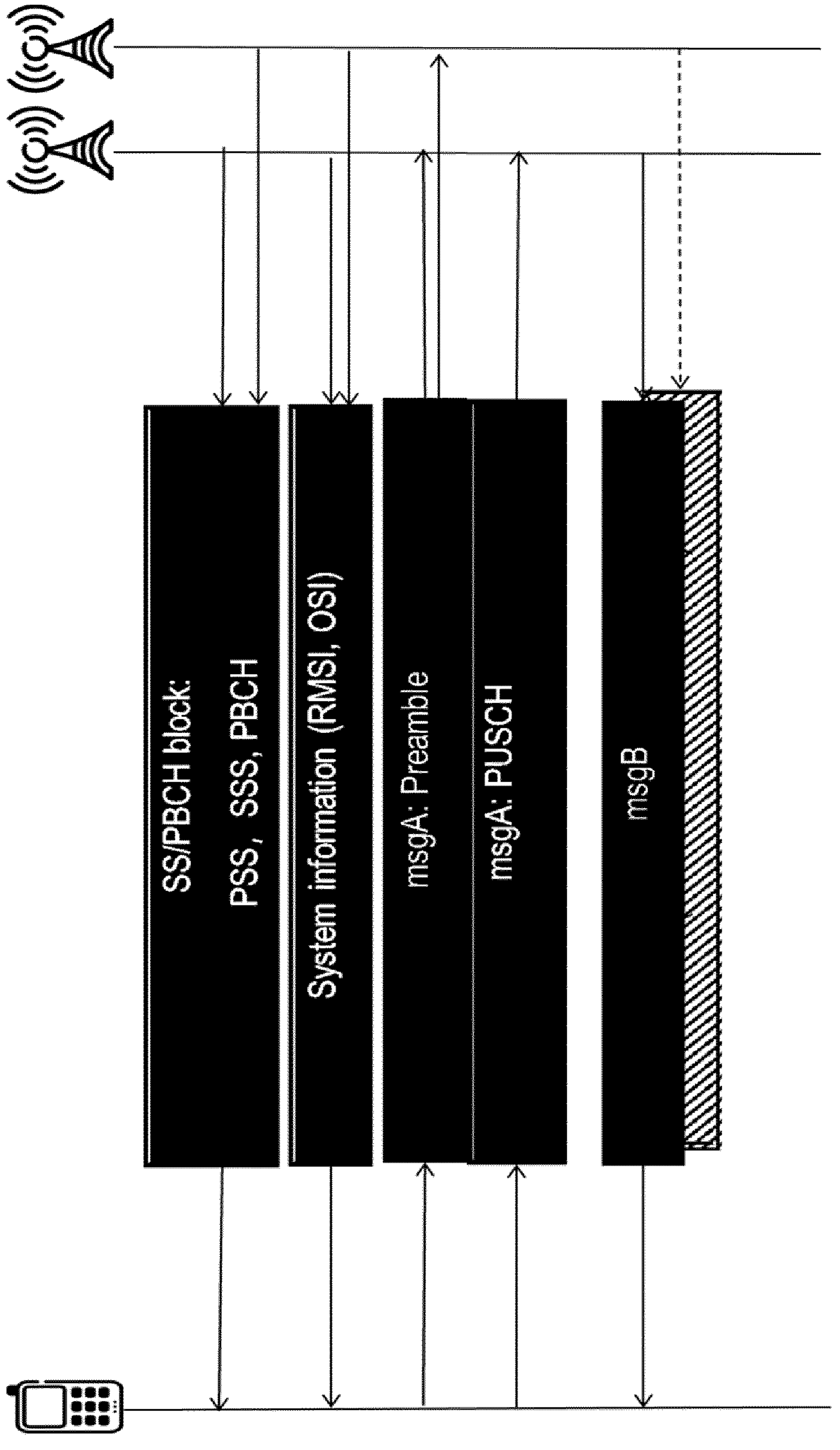
FIG. 2 illustrates a 2-step RA Procedure as disclosed in Release 16.
Figures 3, 4:
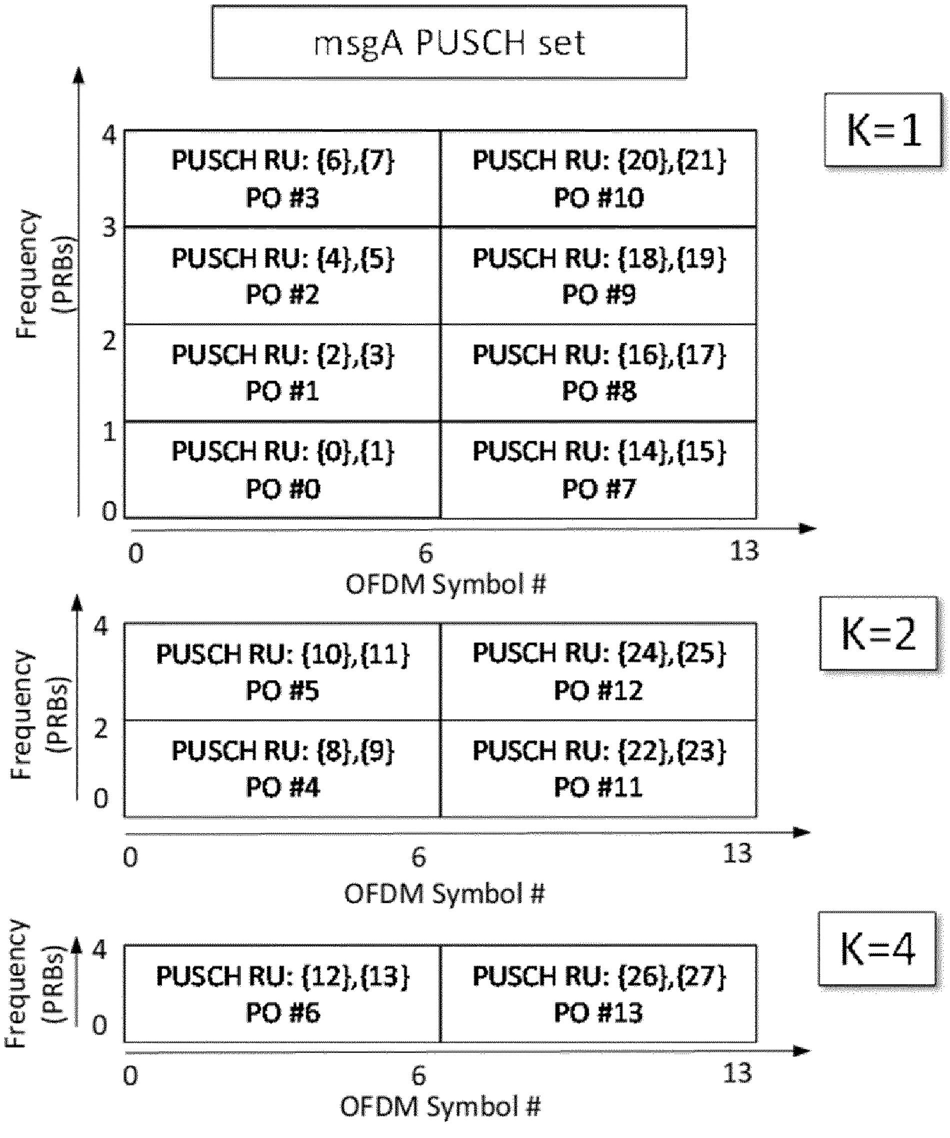
FIG. 3 illustrates a Physical Uplink Shared Channel (PUSCH) occasion.
FIG. 4 illustrates a MsgA PUSCH set comprising a set of PUSCH resource units.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations and Maintenance (O&M), Operations Support System (OSS), Self-Optimizing Network (SON), positioning node (e.g. Evolved-Serving Mobile Location Centre (E-SMLC)), Minimization of Drive Tests (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.

It may be noted that the solution is described in terms of $5^{th}$ Generation (5G)/New Radio (NR), but if 2-step RA were to be specified for LTE (or an evolution thereof) in the future, the solution would be applicable in that system too.)

To address the above described problem(s), solutions, methods, and techniques are proposed to configure a UE to be allowed to ignore the Backoff Indicator in MsgB, and thus save time, under certain circumstances and conditions. For example, the UE may first attempt to perform 2-step RA. If the 2-step RA resources are overloaded, the UE may receive a MsgB without any successRAR MAC sub Protocol Data Unit (subPDU) or fallbackRAR MAC subPDU intended for the UE but find a Backoff Indicator in the msgB. According to certain embodiments, a UE (or other wireless device) may be configured to be allowed to ignore the Backoff Indicator in MsgB and switch to 4-step RA under certain circumstances and when certain possible conditions are fulfilled.

Note that in the context of this document, "ignoring" the Backoff Indicator means that the UE does not wait the time period derived from the Backoff Indicator before the UE again attempts to perform another random access procedure. However, the presence of the Backoff Indicator in msgB may still carry meaning and impact for the UE, e.g. that its presence triggers the UE to switch to 4-step RA, despite not having reached the maximum number of 2-step RA attempts, as described as one embodiment below. An alternative phrasing to "ignoring eth Backoff Indicator" could for instance be "skipping the backoff period stipulated by the Backoff Indicator".

From the UE's perspective, the UE may obtain the related configuration through the means that it is provided and act accordingly, according to certain embodiments.

From the network's perspective, a network node may provide the UE with the related configuration, according to certain embodiments. According to particular embodiments, different means may be used such as, for example, the broadcast system information, dedicated RRC signaling, dedicated MAC signaling or configuration data in the MsgB.

A number of different possible configuration aspects are described herein. For example, in a particular embodiment, a UE may be allowed to ignore the Backoff Indicator in MsgB and switch to 4-step RA only if the UE uses a 4-step RA only RACH Occasion (RO) when switching or if the UE may also use shared ROs for this operation. According to another particular embodiment, the UE may be allowed to ignore the Backoff Indicator in MsgB and switch to 4-step RA only if it has reached the maximum number of 2-step RA attempts or if it can do this regardless of the number of 2-step RA attempts it has performed.

Various flavors of this and additional possibilities and details are elaborated below.

According to a particular embodiment, the configuration may be performed by the network, such as for example, by a gNB, in the broadcast system information or using dedicated signaling, e.g. an RRC message, such as an RRCReconfiguration message (e.g. configuring the UE's behavior in RRC_CONNECTED state) or an RRCRelease message (e.g. configuring the UE's behavior in RRC_IDLE and/or RRC_INACTIVE state) or a MAC PDU including a MAC Control Element (MAC CE) which includes the configuration. Another option is to indicate this configuration in DCI. "Hybrids" may also be an alternative, e.g. providing the configuration via the broadcast system information, but activating and de-activating it using dedicated MAC signaling, e.g. using a new MAC CE. As an alternative, the configuration may be performed through standardization, i.e. specified in a standard specification, in which case the UE would typically be pre-configured in conjunction with its manufacturing.

According to certain embodiments, the configuration informs the UE how to behave in certain situations, or how it is allowed to behave in different situations. Herein, the determination of the UE behavior may be described in terms of that the UE may ignore, may choose not to (e.g. to act on), or in terms of what the UE should or should not perform. When a UE may choose to perform (or may choose to refrain from performing) a certain action without an explicit instruction from the network to do so, this is herein described such that the UE is allowed to perform the action (or is allowed to refrain from performing the action).

In a particular embodiment, the configuration informs the UE that it is allowed to ignore (i.e. may ignore) the Backoff Indicator in a MsgB, if it switches to 4-step RA in a 4-step RA only RO. The rationale for allowing this only in 4-step RA only ROs is that if the 2-step RA resources are overloaded, this may mean that the number of 2-step preambles and MsgA PUSCH transmissions is too high for the gNB to process and since the preamble processing resources assumedly are shared for 2-step preambles and 4-step preambles, switching to 4-step RA in a shared RO would add to the load, whereas the 4-step RA only ROs may be lightly loaded. Such a situation may occur e.g. if there are many UEs located in the same cell and a majority of them experiences/measures channel qualities that exceed the threshold for selection of 2-step RA as the RA type.

In another embodiment, the configuration informs the UE that it is allowed to ignore the Backoff Indicator in a MsgB, if it switches to 4-step RA, regardless whether it uses a shared RO or a 4-step RA only RO for the 4-step preambles transmission. The rationale for this configuration may be that it is only the MsgA PUSCH resources that are strained in the gNB, e.g. the resources for receiving and/or processing MsgA PUSCH transmissions, and this may also negatively (even equally badly) affect the gNB's ability to construct and transmit fallbackRAR MAC subPDUs. In that situation, switching to 4-step RA and transmitting a 4-step preamble may not add to the overload, even if the 4-step preamble is transmitted in a shared RO.

In another particular embodiment, the configuration informs the UE that it is allowed to ignore the Backoff Indicator in a MsgB, if it switches to 4-step RA and transmits the preamble in a specific RO (or set of ROs). These ROs could be indicated using a PRACH mask similar to ra-ssb-OccasionMaskIndex or msgA-SSB-SharedRO-MaskIndex in 3GPP TS 38.331, but designed specifically to indicate permitted ROs when switching to 4-step RA without doing the back off. Such a mask could be signaled to the UE in the broadcast system information or dedicated RRC signaling.

In a particular embodiment, the UE is configured to be allowed to ignore the Backoff Indicator in MsgB and switch to 4-step RA according to any of the above embodiments, only if the UE has reached the maximum number of 2-step RA attempts (i.e. the maximum number that would trigger the UE to conclude that 2-step RA has failed).

In a particular embodiment, the UE is configured to be allowed to ignore the Backoff Indicator in MsgB and switch to 4-step RA (only to 4-step RA only ROs or to either shared ROs or to 4-step RA only ROs), irrespective of the number of 2-step RA attempts the UE has performed.

In all the above embodiments, the expression that the UE "is allowed to" may be given different nuanced properties:

- As one alternative, "is allowed to" gives the UE total freedom as long as the prerequisites are fulfilled. It is thus up to the UE, or the UE implementation, whether it chooses to utilize the possibility to ignore the Backoff Indicator in MsgB and switch to 4-step RA. The UE's choice may then depend on various aspects, such as:
  - Whether a PUSCH resource allocation can be received in 4-step RA procedure which has the same size as the MsgA PUSCH resource allocation the UE has prepared MsgA PUSCH for, and if not, then the UE may take into account e.g.:
    - Whether re-building (i.e. replacing MsgA PUSCH with a re-built Msg3 in the buffer) is a complex (e.g. time and/or resource consuming) operation.
    - Whether the UE is at all capable of actual re-building or instead will have to restart the random access procedure preparations from scratch.
  - The urgency or latency tolerance of the data, application or service that triggered the need for a random access.
  - The presence or arrival of new data or information in a UE UL buffer for a certain logical channel. In some cases, this may constitute a request of scheduling resources for high priority data, or means for transmitting a small payload volume of data.
  - Even if the UE can perform re-building as a low-complex operation, it may take the sizes of the PUSCH allocations it can receive using 2-step RA and 4-step RA respectively into account when determining whether to utilize the possibility to ignore the Backoff Indicator in MsgB and switch to 4-step RA.
  - The time that may be gained from ignoring the Backoff Indicator in MsgB and switch to 4-step RA, which in part depends on the length of the backoff period and the time until the next possibility to transmit a 4-step preamble (while obeying the configured restrictions, such as only using 4-step RA only ROs, depending on the embodiment).
- As another alternative, "is allowed to" may be conditioned by/on the UE's capabilities, i.e. the UE is "formally" configured to be allowed to ignore the Backoff Indicator in MsgB and switch to 4-step RA, as previously described, but only if the UE has certain capabilities, e.g. the capability to perform re-building as a low-complex operation.
- As another alternative, "is allowed to" may be conditioned by/on the properties of the data, application or service that triggered the need for the random access, i.e. the UE is "formally" configured to be allowed to ignore the Backoff Indicator in MsgB and switch to 4-step RA, as previously described, but only if the properties of the data, application or service that triggered the need for the random access fulfill the configured condition.
- As yet another alternative, "is allowed to" may be conditioned by/on whether the UE is doing a prioritized random access procedure. In such a case, this could be indicated in either beamFailureRecoveryConfig or rach-ConfigDedicated where the other prioritized parameters, i.e. msgApreamblePowerRampingStepHighPriority and msgA-ScalingFactorBI, are included.
- As yet another alternative, "is allowed to" may be conditioned by/on the RRC state of the UE. For example, ignoring the Backoff Indicator in MsgB and switching to 4-step RA may be allowed only for UEs in RRC_IDLE or RRC_INACTIVE state. The opposite would also be possible, i.e. that ignoring the Backoff Indicator in MsgB and switching to 4-step RA is only allowed for UEs in RRC_CONNECTED state.
- As yet another alternative, "is allowed to" is conditioned by/on the preamble group that was used for the MsgA transmission. In some cases, one of the preamble groups (e.g. preamble group B) has a low load on the 4-step RA resources, and in such a case, "is allowed to" may have the further condition that the UE selects a preamble from preamble group B when it switches to 4-step RA.
- As yet another alternative, "is allowed to" depends on various aspects, as mentioned above, and the network configures conditions for a combination of these aspects which have to be fulfilled for the UE to be allowed to ignore the Backoff Indicator in MsgB and switch to 4-step RA, as previously described.
- As yet another alternative, "is allowed to" actually makes the UE obliged to ignore the Backoff Indicator in MsgB and switch to 4-step RA, as previously described, provided that the UE's capabilities fulfill certain requirements, e.g. including the capability to perform re-building as a low-complex operation.
- As yet another alternative, "is allowed to" means that the UE should ignore the Backoff Indicator in MsgB and switch to 4-step RA, as previously described, depending on the properties of the data, application or service that triggered the need for the random access. These conditions would be configured and if fulfilled the UE is obliged to ignore the Backoff Indicator in MsgB and switch to 4-step RA, as previously described, but if the conditions are not fulfilled, the UE honors the Backoff Indicator in MsgB.
- As yet another alternative, "is allowed to" depends on various aspects, as mentioned above, and the network configures conditions for a combination of these aspects and if these conditions are fulfilled, the UE is obliged to ignore the Backoff Indicator in MsgB and switch to 4-step RA, as previously described.
- As yet another alternative, "is allowed to" is in fact a strict command to the UE to ignore the Backoff Indicator in MsgB and switch to 4-step RA, as previously described, regardless of the UE's capabilities and the properties of the data, application or service that triggered the need for the random access.

In a particular embodiment, configuring the UE—in any of the above described ways—is optional for the network and in absence of such a configuration (e.g. no configuration data in the system information, nor in dedicated signaling), the UE may choose autonomously (i.e. in accordance with its implementation) whether to ignore the Backoff Indicator in MsgB and switch to 4-step RA. Certain conditions may however still apply, such that the UE has to switch to 4-step RA in a 4-step RA only RO or that the UE has performed the maximum number of 2-step RA attempts.

In a particular embodiment, the network/gNB can indicate in MsgB (i.e. dynamically on the fly) whether UEs (which expected responses in this MsgB but did not receive any) are allowed to ignore the Backoff Indicator in the MsgB and switch to 4-step RA, in any of the previously described ways. The further (previously described) conditions may still be preconfigured through other means (system information, dedicated signaling or standardization) and the indication in MsgB would then only inform the UE when to apply the preconfigured configuration. For such a simple indication, one possibility could be to utilize a presently unused (reserved) bit in the MsgB format. But optionally the MsgB could include also some of the other relevant configuration aspects, such as whether a UE is allowed to ignore the Backoff Indicator and switch to 4-step RA only when the maximum number of 2-step RA attempts have been reached or regardless of the number of performed 2-step RA attempts. Another aspect that could be dynamically configured in the MsgB is whether ignoring of the Backoff Indicator and switching to 4-step RA is allowed only for 4-step RA only ROs or for both shared ROs and 4-step RA only ROs.

With such a dynamic configuration, the network/gNB can handle the situation differently depending on the nature of the load (and also depending on the gNB's implementation). For instance, if the bottleneck is the MsgA PUSCH processing, then UE's can be allowed to switch to 4-step RA using shared ROs, but if the gNB is strained (also) from the number of preambles transmitted in the ROs supporting 2-step RA, then the gNB can indicate that ignoring the Backoff Indicator and switching to 4-step RA is allowed only in 4-step RA only ROs (i.e. ROs with only 4-step PRACH resources configured).

In a variation of the above described mechanism with configuration/indication in MsgB, the indication could inform the UE whether it should use 2-step RA or 4-step RA after having waited a time equal to the backoff period indicated by the Backoff Indicator. Such an indication could be included, even if there is no Backoff Indicator (which implies zero backoff time).

As one embodiment, one or more bit(s) in MsgB could be used to indicate one of the following:

- A UE which expected a response in the MsgB but neither found a successRAR MAC subPDU nor a fallbackRAR MAC subPDU intended for the UE (but which may or may not have found a Backoff Indicator in MsgB), is allowed to ignore the Backoff Indicator (if it was included in MsgB) and switch to 4-step RA (possibly only to 4-step RA only ROs).
- A UE which expected a response in the msgB but neither found a successRAR MAC subPDU nor a fallbackRAR MAC subPDU intended for the UE (but which may or may not have found a Backoff Indicator in msgB), should wait a backoff period as indicated by the Backoff Indicator (if it was included in msgB) and should then continue its random access attempts using 2-step RA (provided that its perceived/measured channel quality exceeds the threshold for selection of 2-step RA).
- A UE which expected a response in the MsgB but neither found a successRAR MAC subPDU nor a fallbackRAR MAC subPDU intended for the UE (but which may or may not have found a Backoff Indicator in MsgB), should wait a backoff period as indicated by the Backoff Indicator (if it was included in MsgB) and should then continue its random access attempts using 4-step RA.

More such alternatives may be conceived by including more of the already elaborated possible conditions and aspects, e.g. related to type of RO, number of performed 2-step RA attempts, UE capabilities, type of data, application or service that triggered the need for the random access, etc.

In a particular embodiment, the unused R bit in the MsgB subheader for backoff may be used to indicate a more detailed back off including an indication to switch to 4-step preamble transmission. This could be used to move users between 2-step and 4-step in case the network experiences high load on the 2-step resources while the load on the 4-step resources are low or moderate. Specifically, the unused R bit in the MsgB BI subheader may be used to indicate different forms of back off for the 2-step procedure. For example, the reserved bit may be used to indicate either 1) back off and continue with 2-step or 2) back off and switch to 4-step. This can be achieved as follows:

- if the R-bit is set to 0, the 2-step UE should do back off according to the BI value and continue with a msgA transmission.
- if the R-bit is set to 1, the 2-step UE should do back off according to the BI value and continue with a preamble transmission in the 4-step procedure.

Thus, in a particular embodiment, the R-bit in the MsgB BI subheader may be used to differentiate if after back off, the UE should continue with MsgA transmission or switch to preamble transmission in the 4-step procedure.

As an alternative to using the reserved bit to signal back off or switch to 4-step procedure would be to allow the 2-step UE which receives a back off for 2-step to switch to 4-step and continue without doing any back off. This procedure would allow the UE to directly try the 4-step procedure which would reduce the latency in case the 2-step resources are suffering from high load. As described above, this may be beneficial especially in the case where the ROs are not shared between the 2-step and 4-step procedures. A drawback may be that the UE could not both back off and switch to 4-step. Thus, in a particular embodiment, a UE receiving a back off indication for the 2-step RA procedure may switch to the 4-step procedure and do preamble transmission without back off if the 2-step and 4-step procedures have separate ROs.

Figure 5:
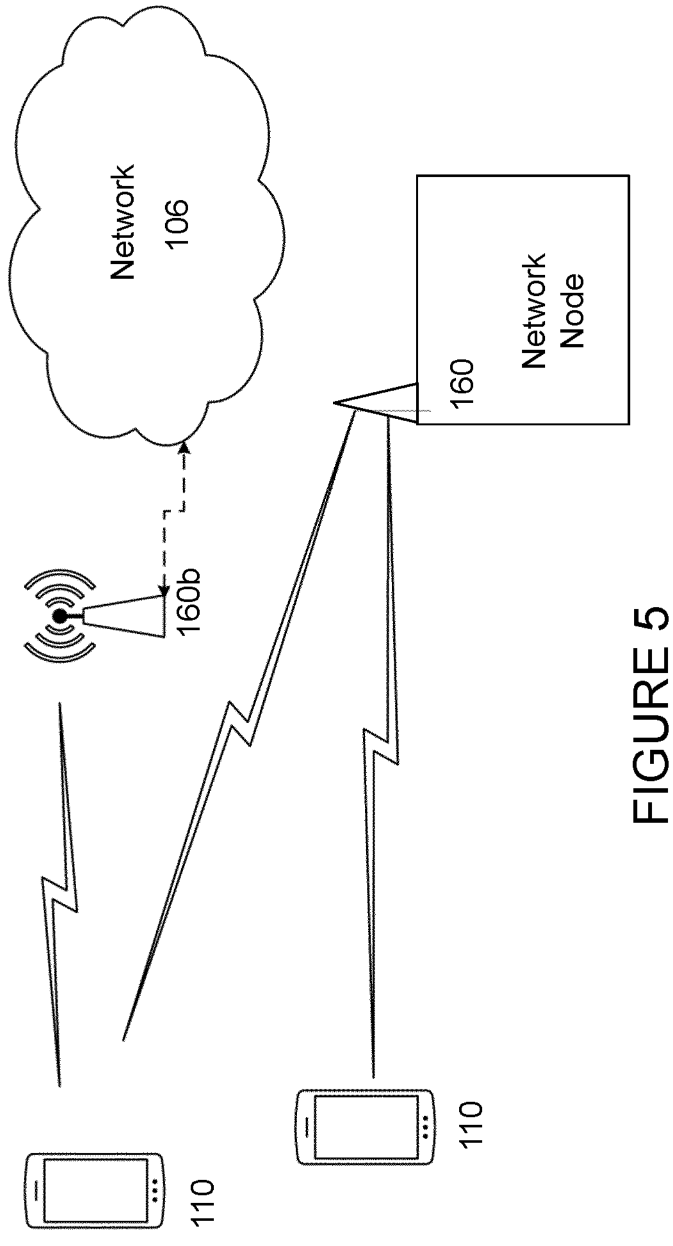
FIG. 5 illustrates an example wireless network, according to certain embodiments.

FIG. 5 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160*b*, and wireless devices 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
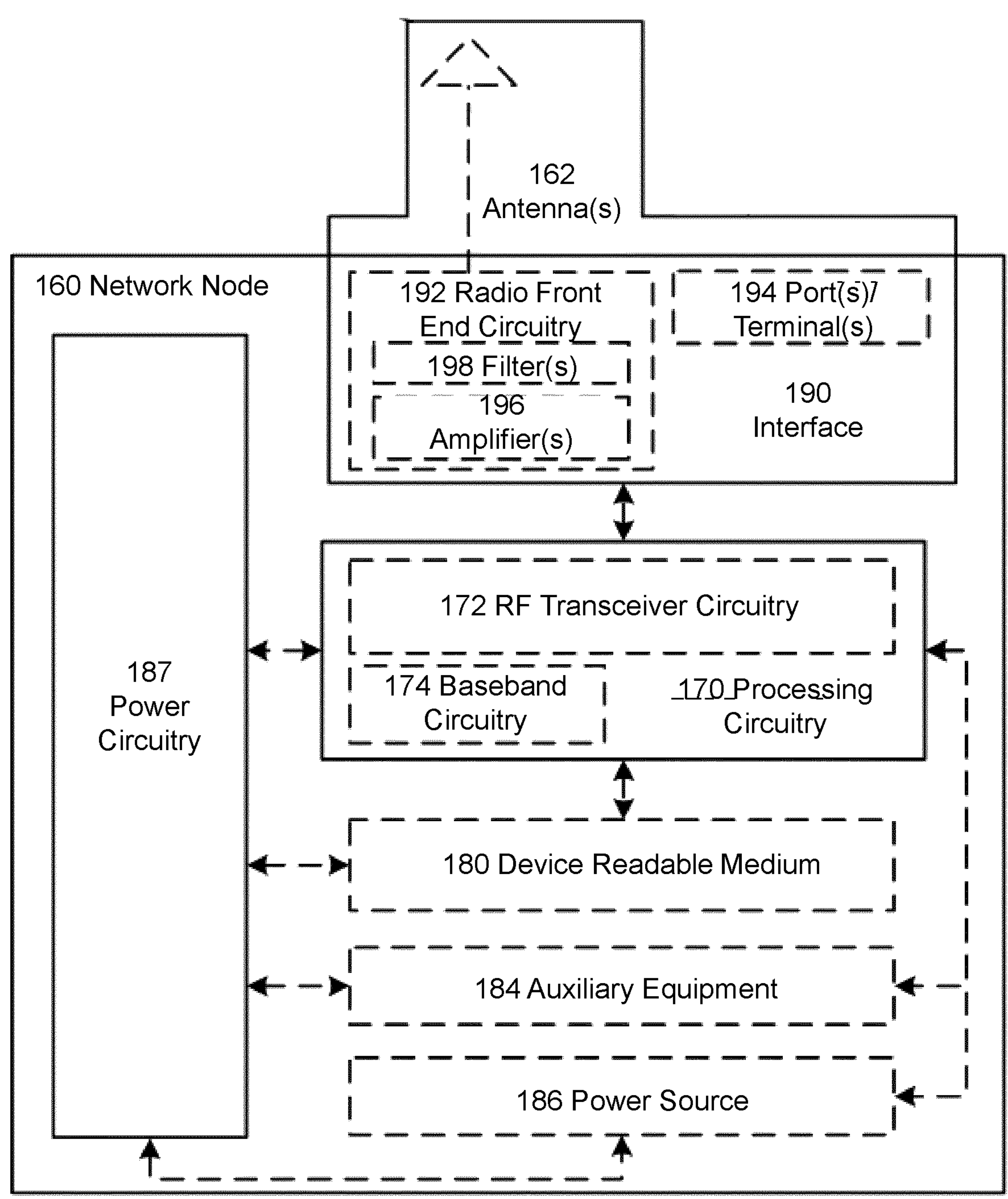
FIG. 6 illustrates an example network node, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centres (MSCs), Mobility Management Entities (MMEs)), Operations and Maintenance (O&M) nodes, Operations Support System (OSS) nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 7:
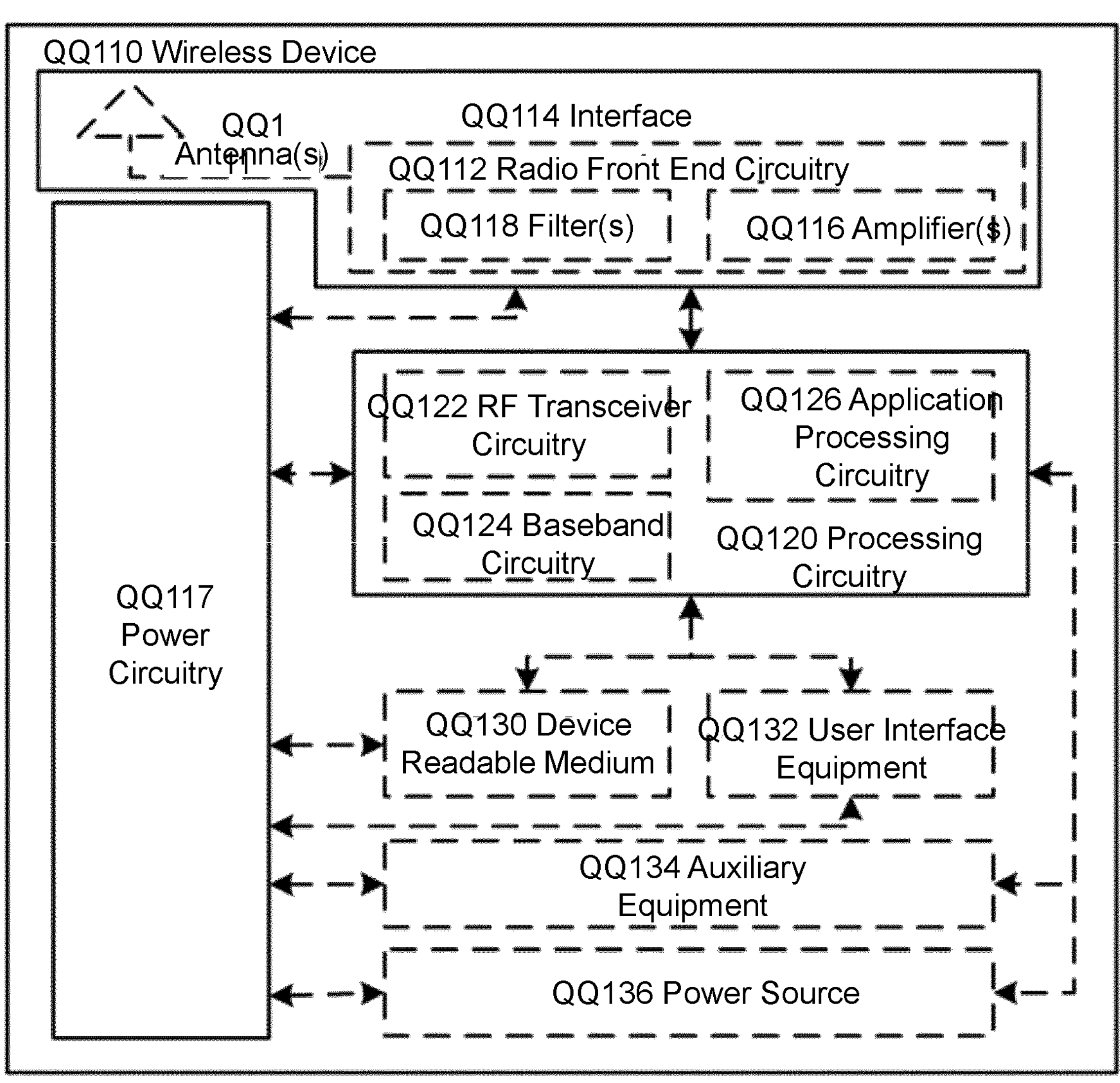
FIG. 7 illustrates an example wireless device, according to certain embodiments.

FIG. 7 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 8:
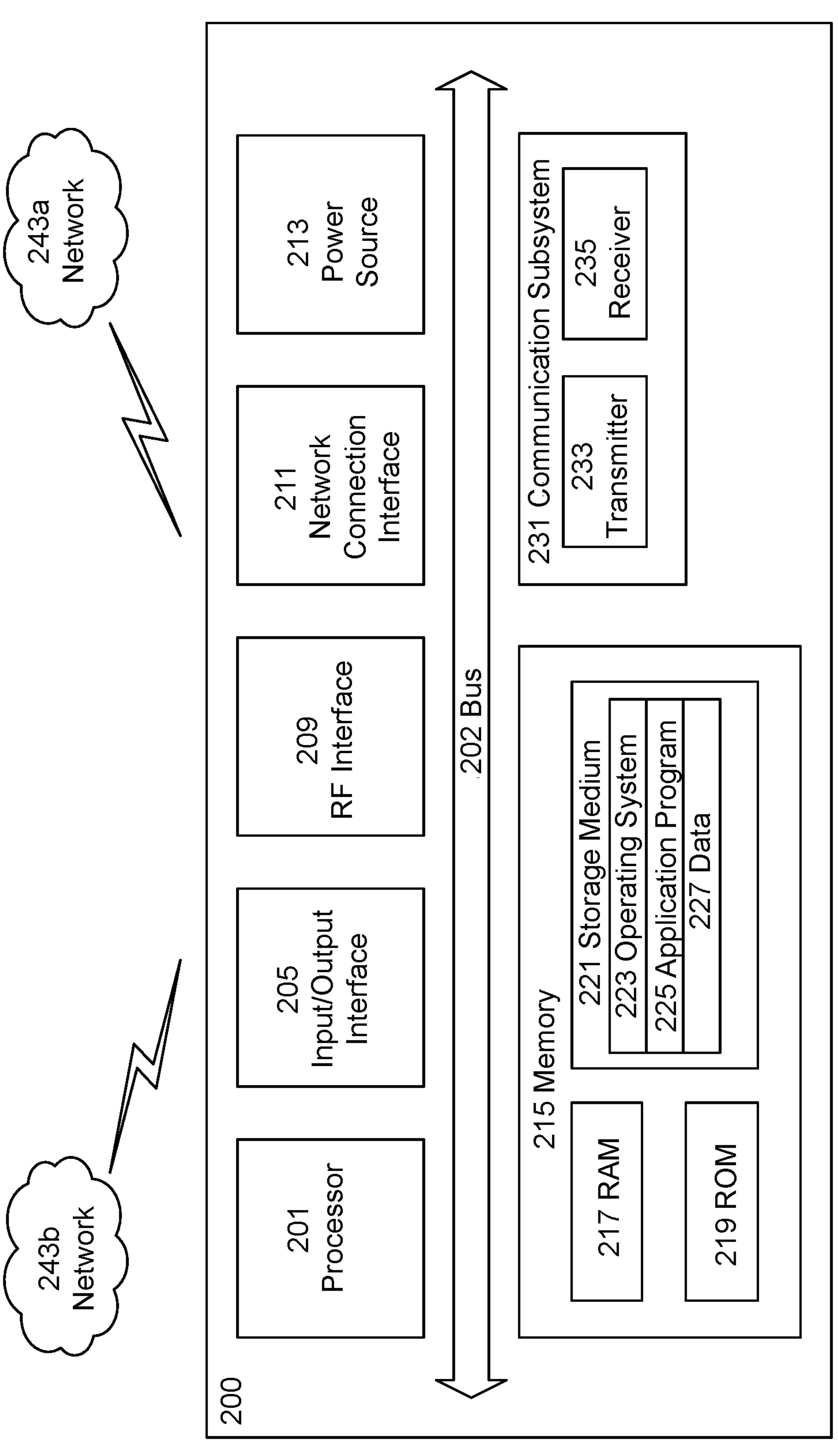
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network **243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235** of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network **243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200**.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9:
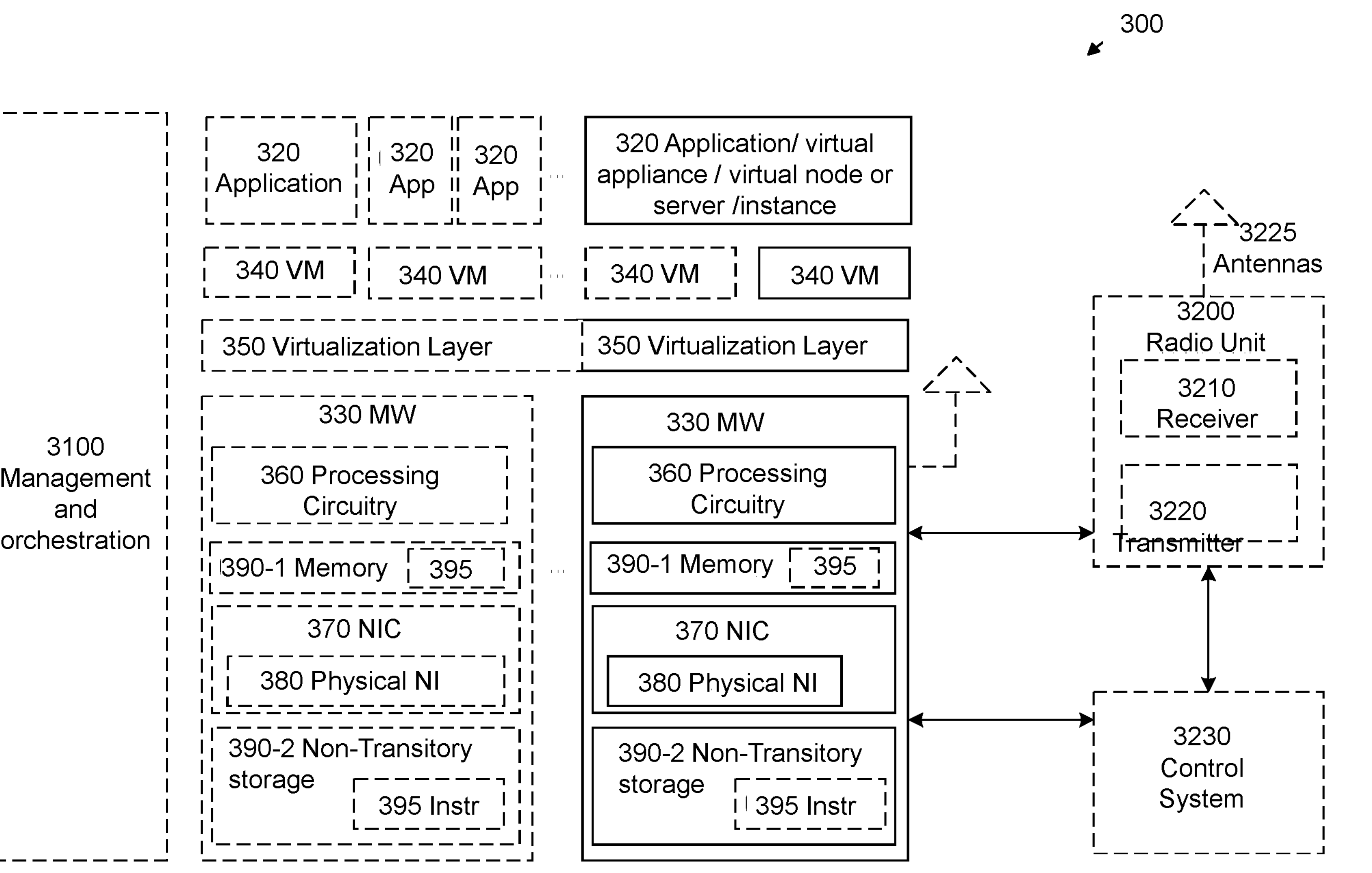
FIG. 9 illustrates a virtualization environment in which functions implemented by some embodiments may be virtualized, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 10:
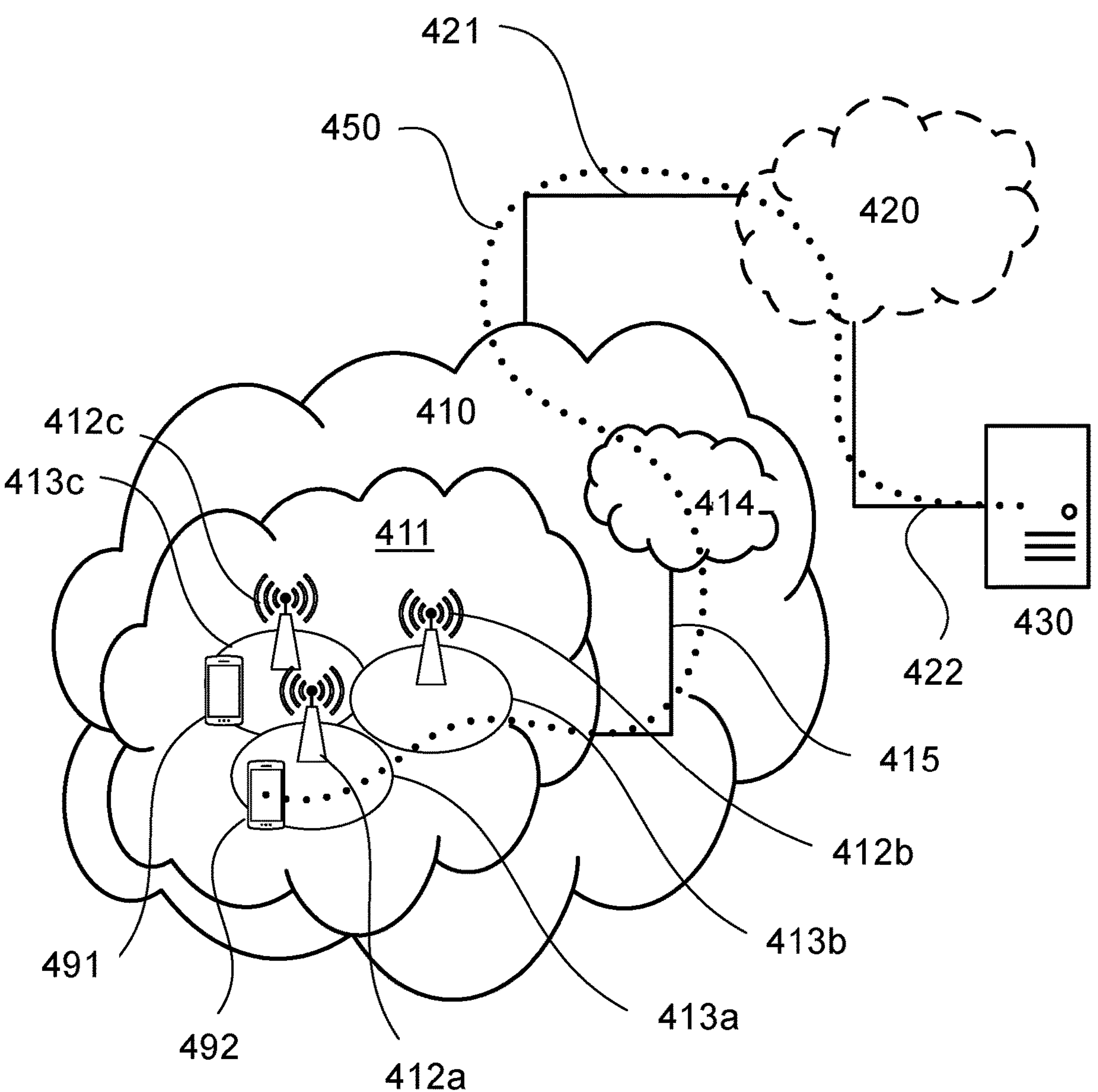
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
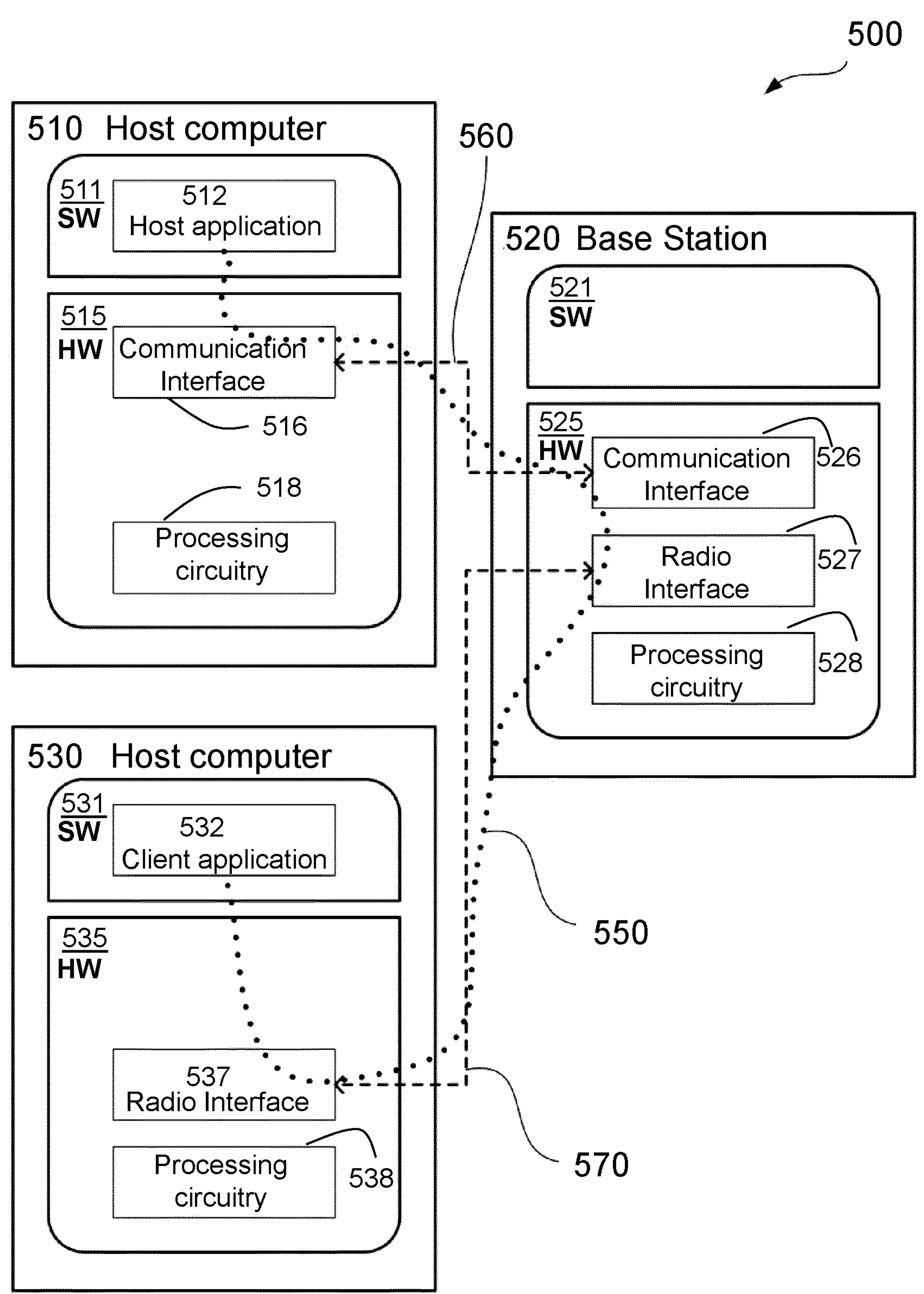
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 12, 13:
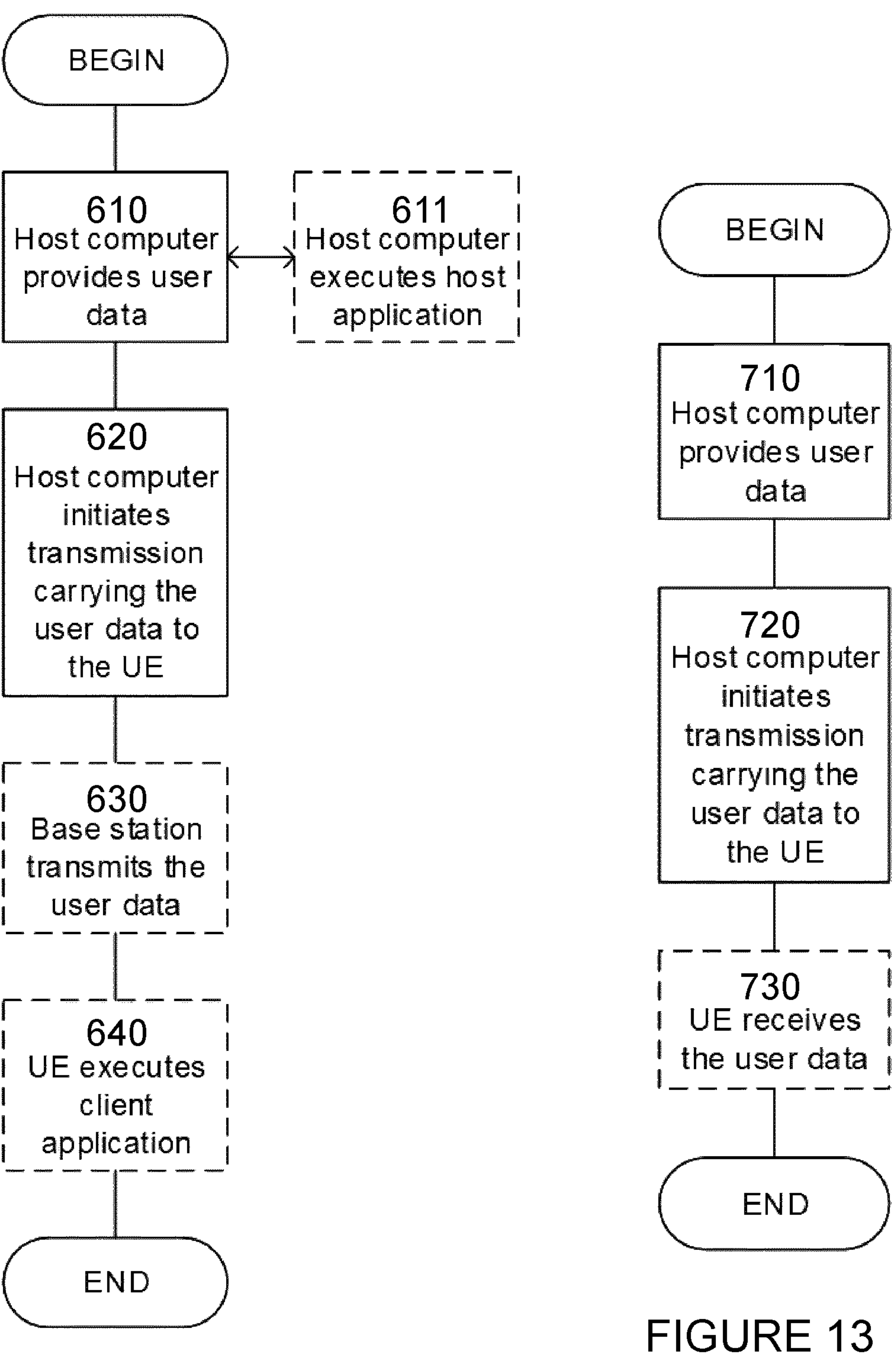
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 14, 15:
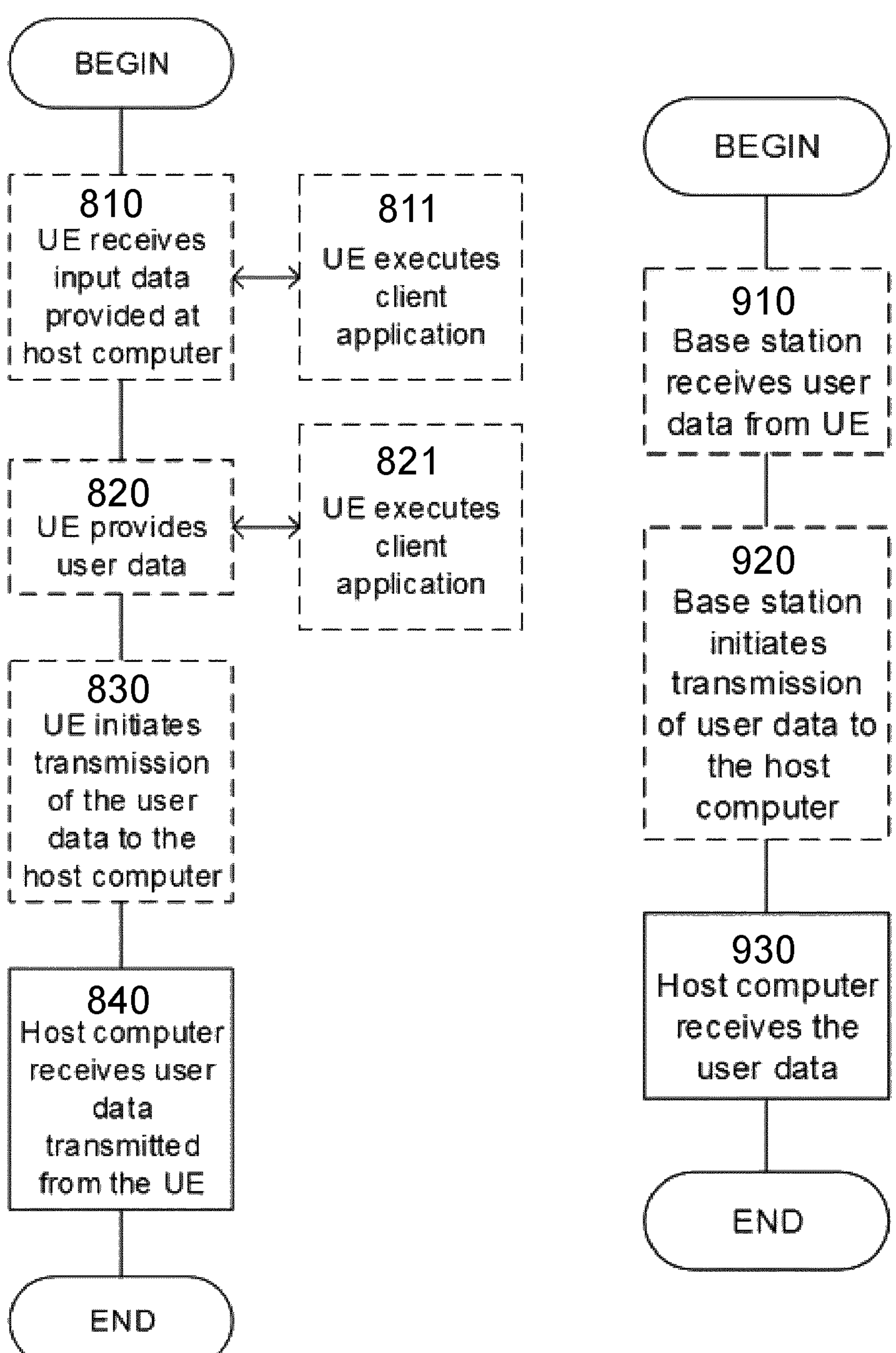
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 16:
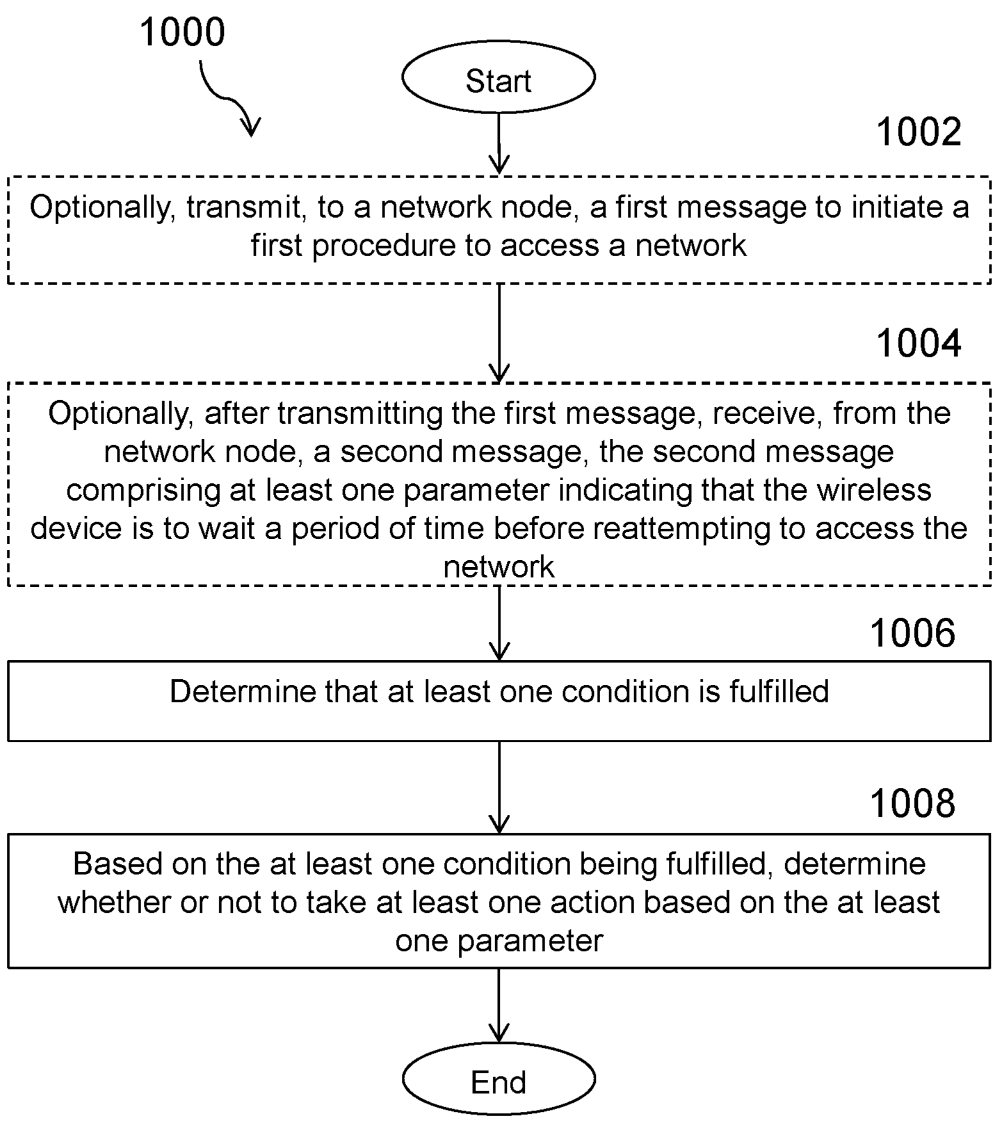
FIG. 16 illustrates an example method by a wireless device, according to certain embodiments.

FIG. 16 depicts a method 1000 by a wireless device 110, according to certain embodiments. Optionally, at step 1002, the wireless device 110 transmits, to a network node 160, a first message to initiate a first procedure to access a network. Optionally, after transmitting the first message, the wireless device 110 receives, from the network node 160, a second message, at step 1004. The second message comprises at least one parameter indicating that the wireless device 110 is to wait a period of time before reattempting to access the network. At step 1006, the wireless device 110 determines that at least one condition is fulfilled. At step 1008, based on the at least one condition being fulfilled, the wireless device 110 determines whether or not to take at least one action based on the at least one parameter.

Figure 17:
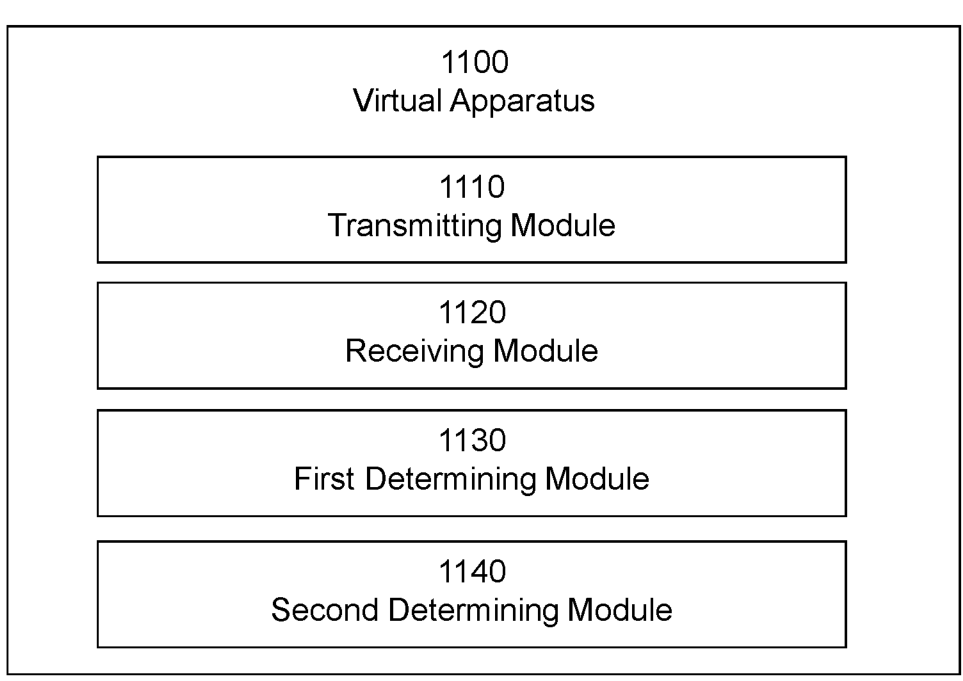
FIG. 17 illustrates an example virtual apparatus, according to certain embodiments.

FIG. 17 illustrates a schematic block diagram of a virtual apparatus 1100 in a wireless network (for example, the wireless network shown in FIG. 5). The apparatus may be implemented in a wireless device or network node (e.g., wireless device 110 or network node 160 shown in FIG. 5). Apparatus 1100 is operable to carry out the example method described with reference to FIG. 16 and possibly any other processes or methods disclosed herein. It is also to be understood that the method of FIG. 16 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1110, receiving module 1120, first determining module 1130, second determining module 1140, and any other suitable units of apparatus 1100 to perform corresponding functions according one or more embodiments of the present disclosure.

According to certain embodiments, transmitting module 1110 may perform certain of the transmitting functions of the apparatus 1100. For example, transmitting module 1110 may transmit, to a network node, a first message to initiate a first procedure to access a network.

According to certain embodiments, receiving module 1120 may perform certain of the receiving functions of the apparatus 1100. For example, after transmitting the first message, receiving module 1120 may receive, from the network node, a second message. The second message comprises at least one parameter indicating that the wireless device is to wait a period of time before reattempting to access the network.

According to certain embodiments, first determining module 1130 may perform certain of the determining functions of the apparatus 1100. For example, first determining module 1130 may determine that at least one condition is fulfilled.

According to certain embodiments, second determining module 1140 may perform certain other of the determining functions of the apparatus 1100. For example, based on the at least one condition being fulfilled, second determining module 1120 may determine whether or not to take at least one action based on the at least one parameter.

As used herein, the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 18:
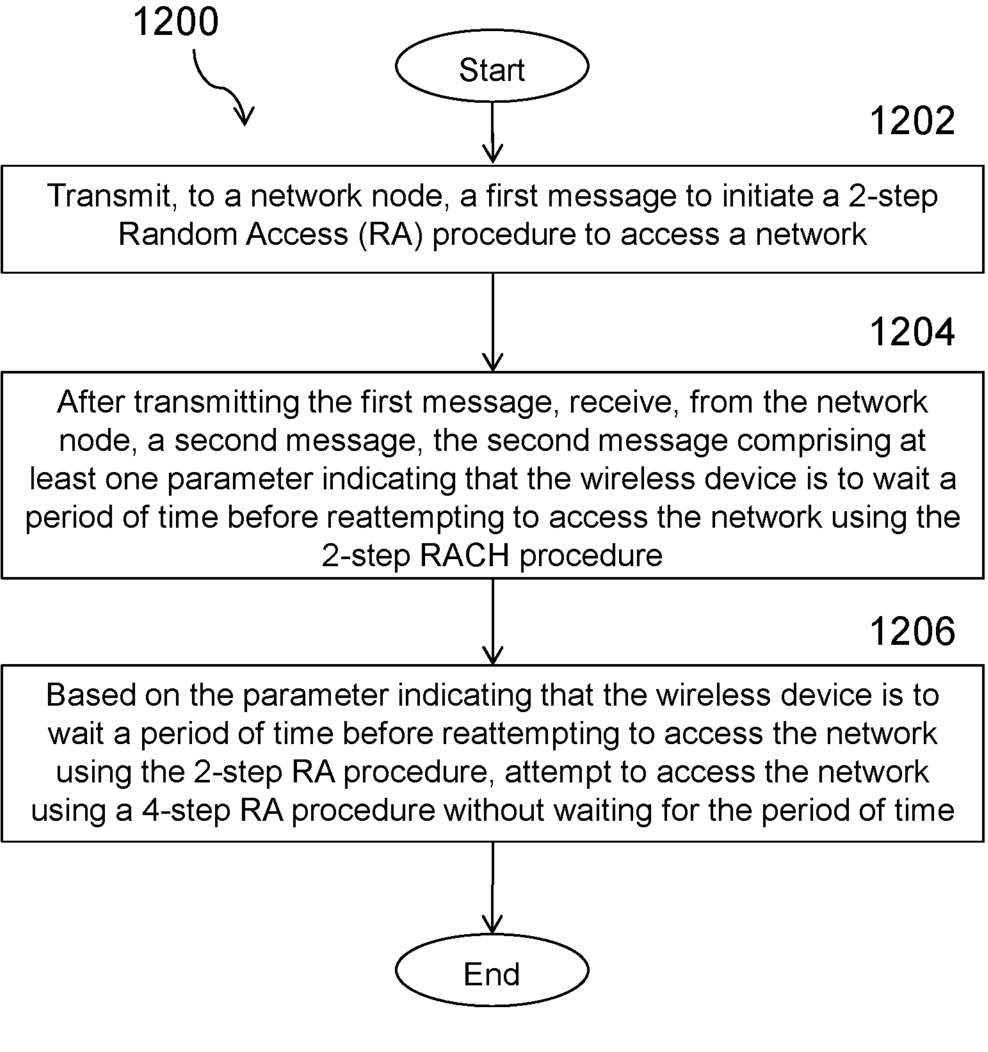
FIG. 18 illustrates another example method by a wireless device, according to certain embodiments.

FIG. 18 depicts a method 1200 by a wireless device 110, according to certain embodiments. At step 1202, the wireless device 110 transmits, to a network node 160, a first message to initiate a 2-step Random Access, RA, procedure to access a network. After transmitting the first message, the wireless device 110 receives, from the network node 160, a second message, at step 1204. The second message includes at least one parameter indicating that the wireless device is to wait a period of time before reattempting to access the network using the 2-step RA procedure. Based on the parameter indicating that the wireless device is to wait a period of time before reattempting to access the network using the 2-step RA procedure, the wireless device attempts to access the network using a 4-step RA procedure without waiting for the period of time, at step 1206.

In a particular embodiment, a maximum number of attempts for the 2-step RA procedure has not been exceeded when the attempt to access the network using the 4-step RA procedure is initiated.

In a particular embodiment, the second message comprises a msgB.

In a particular embodiment, the wireless device 110 determines that the second message does not include an indication that the network node 160 received a RA preamble in the first message from the wireless device 110.

In a further particular embodiment, the at least one parameter comprises a backoff indicator.

In a particular embodiment, the wireless device 110 determines a RA occasion for performing the 4-step RA procedure.

In a further particular embodiment, the RA occasion comprises a 4-step RA occasion that is dedicated to the 4-step RA procedure. As used herein, an RA occasion that is dedicated to a 4-step RA procedure is an RA occasion that can only be used for the 4-step RA procedure. Thus, the dedicated RA occasion cannot be used for a 2-step RACH procedure.

In a further particular embodiment, the RA occasion is for transmitting a first message in the 4-step RA procedure.

In a particular embodiment, the wireless device 110 determines that the second message indicates that the wireless device 110 is to attempt to access the network using the 4-step RA procedure without determining the period of time to wait.

In a particular embodiment, the wireless device 110 determines that the wireless device 110 is configured to ignore the at least one parameter.

In a further particular embodiment, determining that the wireless device is configured to ignore the at least one parameter is based on at least one of: a capability of the wireless device; a property of data, an application, or a service that triggered the 2-step RA procedure; whether the 2-step RA procedure is a prioritized random access procedure; an RRC state of the wireless device; a preamble group used for the transmission of the first message; whether the network node configured the wireless device to ignore the at least one parameter; and whether the wireless device is required to ignore the at least one parameter.

In a particular embodiment, the wireless device is configured, based on a specification, to, in response to receiving the second message, attempt to access the network using the 4-step RA procedure without determining the period of time to wait.

In a particular embodiment, prior to receiving the second message from the network, the wireless device 110 receives a configuration message. The configuration message configures the wireless device 110 to attempt to access the network using a 4-step RA procedure without waiting for the period of time in response to receiving a response to the message initiating access to the network.

In a further particular embodiment, the configuration message is received as at least one of: broadcast system information; a Radio Resource Control, RRC, message; an RRCRelease message; a RRCReconfiguration message; a Medium Access Control, MAC, message comprising a MAC packet data unit or a MAC control element; and downlink control information, DCI.

In a particular embodiment, the wireless device 110 performs at least one of: determining that the wireless device is allowed to reattempt to access the network using the 4-step RA procedure without determining the period of time to wait; determining that a PUSCH resource allocation can be received in the 4-step RA procedure which has a same size as a PUSCH resource allocation associated with the 2-step RA procedure; determining an urgency level or latency tolerance of data to be transmitted triggers a need for reattempt to access the network using a 4-step RA procedure without determining the period of time to wait; determining a presence of or an arrival of new data or information in an uplink buffer of the wireless device; determining a time to be gained from ignoring the at least one parameter and initiating the 4-step procedure for initiating access to the network.

Figure 19:
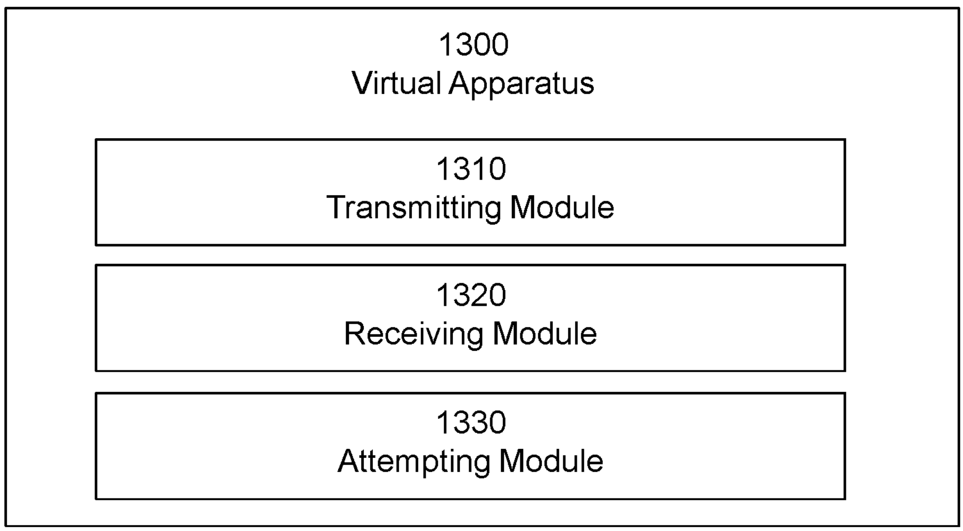
FIG. 19 illustrates another example virtual apparatus, according to certain embodiments.

FIG. 19 illustrates a schematic block diagram of a virtual apparatus 1300 in a wireless network (for example, the wireless network shown in FIG. 5). The apparatus may be implemented in a wireless device or network node (e.g., wireless device 110 or network node 160 shown in FIG. 5). Apparatus 1300 is operable to carry out the example method described with reference to FIG. 18 and possibly any other processes or methods disclosed herein. It is also to be understood that the method of FIG. 18 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1310, receiving module 1320, attempting module 1330, and any other suitable units of apparatus 1300 to perform corresponding functions according one or more embodiments of the present disclosure.

According to certain embodiments, transmitting module 1310 may perform certain of the transmitting functions of the apparatus 1300. For example, transmitting module 1310 may transmit, to a network node 160, a first message to initiate a 2-step Random Access (RA) procedure to access a network.

According to certain embodiments, receiving module 1320 may perform certain of the receiving functions of the apparatus 1300. For example, after transmitting the first message, receiving module 1320 may receive, from the network node 160, a second message. The second message includes at least one parameter indicating that the wireless device is to wait a period of time before reattempting to access the network using the 2-step RA procedure.

According to certain embodiments, attempting module 1330 may perform certain of the attempting functions of the apparatus 1300. For example, based on the parameter indicating that the wireless device 110 is to wait a period of time before reattempting to access the network using the 2-step RA procedure, attempting module 1330 may attempt to access the network using a 4-step RA procedure without waiting for the period of time.

Figure 20:
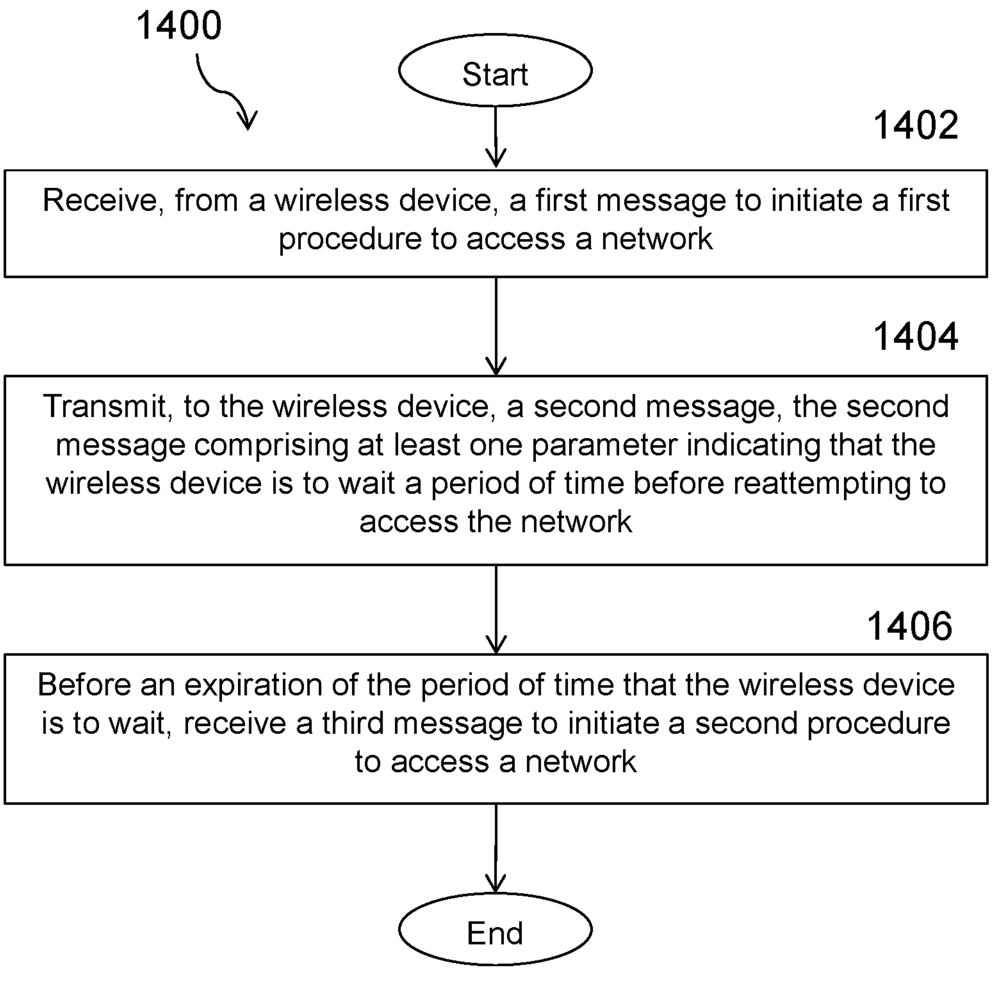
FIG. 20 illustrates an example method by a network node, according to certain embodiments.

FIG. 20 depicts a method 1400 performed by a network node 160, according to certain embodiments. At step 1402, the network node 160 receives, from a wireless device 110, a first message to initiate a first procedure to access a network. At step 1404, the network node 160 transmits, to the wireless device 110, a second message. The second message includes at least one parameter indicating that the wireless device 110 is to wait a period of time before reattempting to access the network. Before an expiration of the period of time that the wireless device 110 is to wait, the network node 160 receives a third message to initiate a second procedure to access a network, at step 1406.

Figure 21:
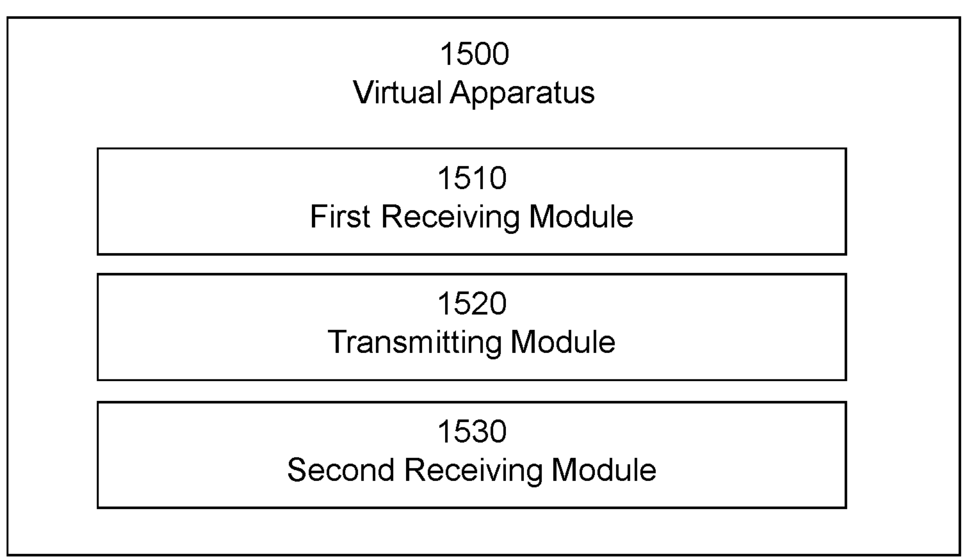
FIG. 21 illustrates another example virtual apparatus, according to certain embodiments.

FIG. 21 illustrates a schematic block diagram of a virtual apparatus 1500 in a wireless network (for example, the wireless network shown in FIG. 5). The apparatus may be implemented in a wireless device or network node (e.g., wireless device 110 or network node 160 shown in FIG. 5). Apparatus 1500 is operable to carry out the example method described with reference to FIG. 20 and possibly any other processes or methods disclosed herein. It is also to be understood that the method of FIG. 20 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1510, transmitting module 1520, second receiving module 1530, and any other suitable units of apparatus 1500 to perform corresponding functions according one or more embodiments of the present disclosure.

According to certain embodiments, first receiving module 1510 may perform certain of the receiving functions of the apparatus 1500. For example, first receiving module 1510 may receive, from a wireless device, a first message to initiate a first procedure to access a network.

According to certain embodiments, transmitting module 1520 may perform certain of the transmitting functions of the apparatus 1500. For example, transmitting module 1520 may transmit, to the wireless device, a second message. The second message includes at least one parameter indicating that the wireless device is to wait a period of time before reattempting to access the network.

According to certain embodiments, second receiving module 1530 may perform certain other of the receiving functions of the apparatus 1500. For example, before an expiration of the period of time that the wireless device is to wait, second receiving module 1530 may receive a third message to initiate a second procedure to access a network.

Figure 22:
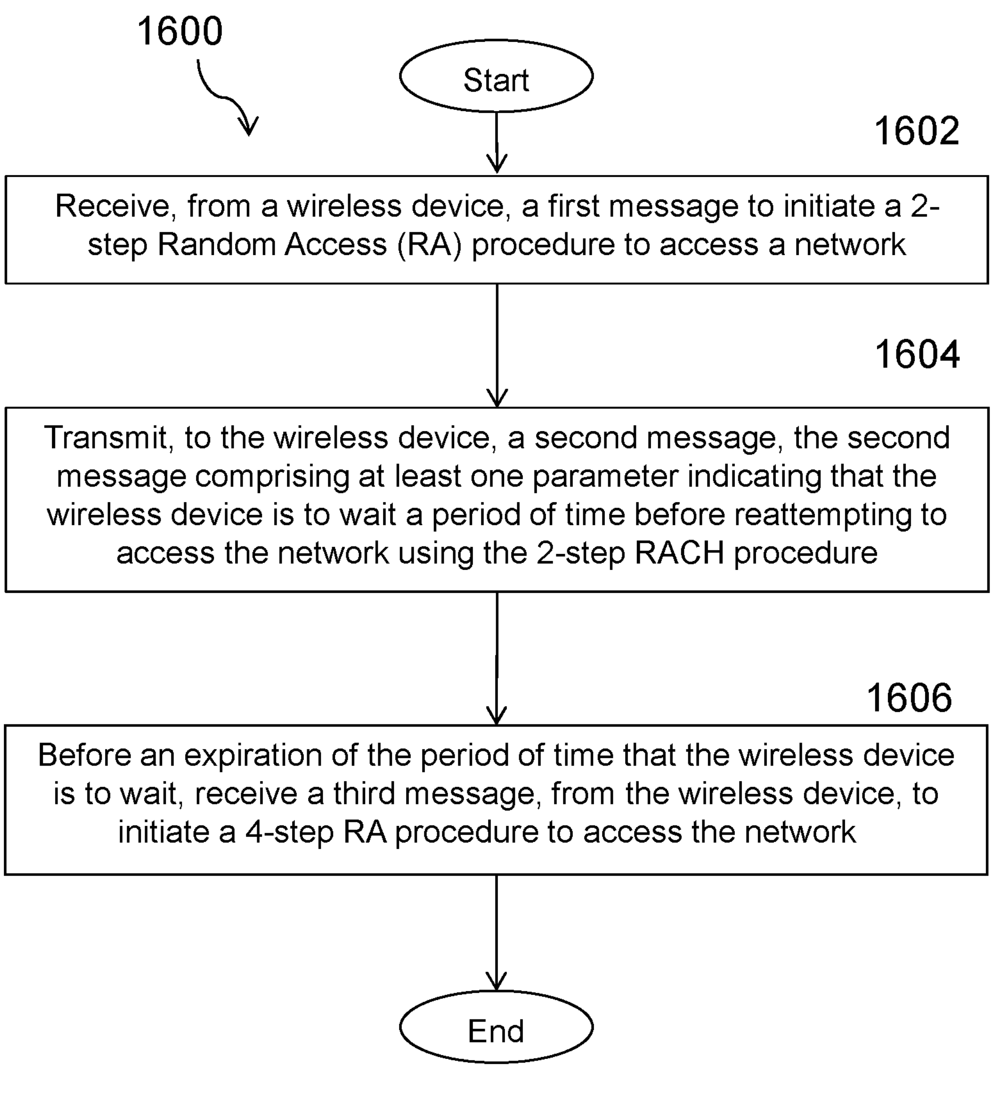
FIG. 22 illustrates another example method by a network node, according to certain embodiments.

FIG. 22 depicts a method 1600 performed by a network node 160, according to certain embodiments. At step 1602, the network node 160 receives, from a wireless device 110, a first message to initiate a 2-step RA procedure to access a network. At step 1604, the network node 160 transmits, to the wireless device 110, a second message. The second message includes at least one parameter indicating that the wireless device 110 is to wait a period of time before reattempting to access the network using the 2-step RA procedure. Before an expiration of the period of time that the wireless device 110 is to wait, the network node 160 receives a third message, from the wireless device 110, to initiate a 4-step RA procedure to access the network.

In a particular embodiment, a maximum number of attempts for the 2-step RA procedure has not been exceeded when the attempt to access the network using the 4-step RA procedure is initiated.

In a particular embodiment, the second message comprises a msgB.

In a particular embodiment, the second message does not include an indication that the network node 160 received a RA preamble in the first message from the wireless device 110.

In a particular embodiment, the at least one parameter comprises a backoff indicator.

In a particular embodiment, the network node 160 configures the wireless device 110 to ignore the at least one parameter indicating that the wireless device 110 is to wait the period of time before reattempting to access the network using the 2-step RA procedure when at least one condition is fulfilled.

In a particular embodiment, the network node 160 configures the wireless device 110 to determine a RA occasion for performing the 4-step RA procedure.

In a further particular embodiment, the RA occasion comprises a 4-step RA occasion that is dedicated to the 4-step RA procedure.

In a further particular embodiment, the RA occasion is for transmitting the third message associated with the 4-step RA procedure.

In a particular embodiment, the network node 160 configures the wireless device 110 to determine that the wireless device 110 is configured to ignore the at least one parameter.

In a further particular embodiment, the wireless device 110 is configured to ignore the at least one parameter based on at least one of: a capability of the wireless device; a property of data, an application, or a service that triggered the 2-step RA procedure; whether the 2-step RA procedure is a prioritized random access procedure; an RRC state of the wireless device; a preamble group used for the transmission of the first message; whether the network node configured the wireless device to ignore the at least one parameter; and whether the wireless device is required to ignore the at least one parameter.

In a particular embodiment, the network node 160 configures the wireless device 110 to perform at least one of: determine that the wireless device is allowed to reattempt to access the network using the 4-step RA procedure without determining the period of time to wait; determine that a PUSCH resource allocation can be received in the 4-step RA procedure which has a same size as a PUSCH resource allocation associated with the 2-step RA procedure; determine an urgency level or latency tolerance of data to be transmitted triggers a need for reattempting to access the network using the 4-step RA procedure before the expiration of the period of time associated with the at least one parameter; determine a presence of or an arrival of new data or information in an uplink buffer of the wireless device; determine a time to be gained from ignoring the at least one parameter and initiating the 4-step RA procedure for initiating access to the network.

In a further particular embodiment, the second message indicates that the wireless device 110 is to attempt to access the network using the 4-step RA procedure without waiting for the period of time.

In a particular embodiment, prior to transmitting the second message to the wireless device 110, the network node 160 transmits a configuration message to the wireless device 110 to configure the wireless device 110 to, in response to receiving the second message, attempt to access the network using the 4-step RA procedure without waiting for the period of time.

In a further particular embodiment, the configuration message is transmitted as at least one of: broadcast system information; a Radio Resource Control, RRC, message; an RRCReconfiguration message; an RRCRelease message; a Medium Access Control, MAC, message comprising a MAC packet data unit or a MAC control element; and downlink control information, DCI.

Figure 23:
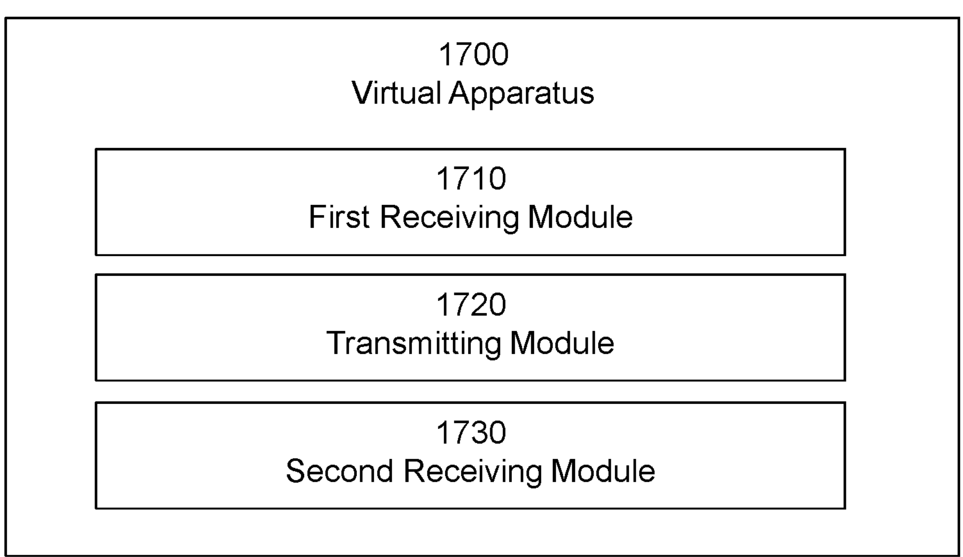
FIG. 23 illustrates another example virtual apparatus, according to certain embodiments.

FIG. 23 illustrates a schematic block diagram of a virtual apparatus 1700 in a wireless network (for example, the wireless network shown in FIG. 5). The apparatus may be implemented in a wireless device or network node (e.g., wireless device 110 or network node 160 shown in FIG. 5). Apparatus 1700 is operable to carry out the example method described with reference to FIG. 22 and possibly any other processes or methods disclosed herein. It is also to be understood that the method of FIG. 22 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1710, transmitting module 1720, second receiving module 1730, and any other suitable units of apparatus 1700 to perform corresponding functions according one or more embodiments of the present disclosure.

According to certain embodiments, first receiving module 1710 may perform certain of the receiving functions of the apparatus 1700. For example, first receiving module 1710 may receive, from a wireless device 110, a first message to initiate a 2-step RA procedure to access a network.

According to certain embodiments, transmitting module 1720 may perform certain of the transmitting functions of the apparatus 1700. For example, transmitting module 1720 may transmit, to the wireless device 110, a second message. The second message includes at least one parameter indicating that the wireless device 110 is to wait a period of time before reattempting to access the network using the 2-step RA procedure.

According to certain embodiments, second receiving module 1730 may perform certain other of the receiving functions of the apparatus 1700. For example, before an expiration of the period of time that the wireless device 110 is to wait second receiving module 1730 may receive a third message, from the wireless device 110, to initiate a 4-step RA procedure to access the network.

EXAMPLE EMBODIMENTS

Example Embodiment 1. A method performed by a wireless device, the method comprising: optionally, transmitting, to a network node, a first message to initiate a first procedure to access a network; optionally, after transmitting the first message, receiving, from the network node, a second message, the second message comprising at least one parameter indicating that the wireless device is to wait a period of time before reattempting to access the network; determining that at least one condition is fulfilled; and based on the at least one condition being fulfilled, determining whether or not to take at least one action based on the at least one parameter.

Example Embodiment 2. The method of Example Embodiment 1, wherein the first procedure to access the network comprises a 2-step RACH procedure and the second message comprises a msgB.

Example Embodiment 3. The method of any one of Example Embodiments 1 to 2, further comprising determining that the second message does not include a include an indication that the network node received a RACH preamble in a first message from the wireless device.

Example Embodiment 4. The method of any one of Example Embodiments 1 to 3, further comprising determining that the second message does not include an indication that the wireless device is to reattempt to access the network using a second procedure.

Example Embodiment 5. The method of Example Embodiment 4, wherein the first procedure is a 2-step RACH procedure and the second procedure is a 4-step RACH procedure.

Example Embodiment 6. The method of any one of Example Embodiments 1 to 5, wherein the at least one parameter comprises a backoff indicator.

Example Embodiment 7. The method of any one of Example Embodiments 1 to 6, wherein determining whether or not to take the at least one action comprises determining to ignore the at least one parameter indicating that the wireless device is to wait the period of time before reattempting to access the network.

Example Embodiment 8. The method of Example Embodiment 7, wherein ignoring the at least one parameter comprises at least one of: reattempting to access the network using the first procedure before the period of time associated with the at least one parameter has passed; reattempting to access the network using a second procedure that is different than the first procedure before the period of time associated with the at least one parameter has passed; skipping the period of time associated with the at least one parameter and reattempting to access the network before the period of time associated with the at least one parameter has passed; and switching from the first procedure to a second procedure to attempt to access the network, wherein the first procedure is a 2-step RACH procedure and the second procedure is a 4-step procedure, and wherein a maximum number of attempts for the 2-step RACH procedure has not been exceeded.

Example Embodiment 9. The method of any one of Example Embodiments 1 to 7, wherein determining whether or not to take the at least one action comprises determining to and/or initiating a second procedure to access the network.

Example Embodiment 10. The method of Example Embodiment 9, wherein the second procedure comprises a 4-step RACH procedure.

Example Embodiment 11. The method of any one of Example Embodiments 9 to 10, wherein the at least one condition comprises determining or identifying a 4-step RACH occasion for performing the second procedure.

Example Embodiment 12. The method of any one of Example Embodiments 9 to 10, wherein the at least one condition comprises determining or identifying a RACH occasion that is dedicated to a 4-step RACH procedure only (i.e., cannot be used for a 2-step RACH procedure).

Example Embodiment 13. The method of any one of Example Embodiments 9 to 12, further comprising determining or obtaining a RACH occasion for transmitting a first message in the second procedure.

Example Embodiment 14. The method of Example Embodiment 13, wherein the at least one condition indicates the RACH occasion for transmitting the first message in the second procedure.

Example Embodiment 15. The method of any one of Example Embodiments 1 to 14, wherein determining that the at least one condition is fulfilled comprises determining that the wireless device is configured to ignore the at least one parameter.

Example Embodiment 16. The method of any one of Example Embodiments 1 to 15, determining that the at least one condition is fulfilled comprises determining that the wireless device has reached a maximum number of failed attempts associated with the first procedure.

Example Embodiment 17. The method of Example Embodiment 16, wherein the maximum number of failed attempts is two.

Example Embodiment 18. The method of any one of Example Embodiments 1 to 17, further comprising, prior to receiving the second message from the network, receiving a configuration message configuring the wireless device to: determine whether the at least one condition is fulfilled in response to receiving a response to a message initiating access to the network; and based on the at least one condition being fulfilled, determine whether or not to take at least one action based on the at least one parameter in response to receiving the response to the message initiating access to the network.

Example Embodiment 19. The method of any one of Example Embodiments 1 to 17, further comprising, prior to receiving the second message from the network node, receiving a configuration message configuring the wireless device to: determine whether the at least one condition is fulfilled in response to receiving the second message; and based on the at least one condition being fulfilled, determine whether or not to take the at least one action based on the at least one parameter in response to receiving the second message.

Example Embodiment 20. The method of any one of Example Embodiments 18 to 19, wherein the configuration message is received as broadcast system information.

Example Embodiment 21. The method of any one of Example Embodiments 18 to 19, wherein the configuration message is received in an RRC message.

Example Embodiment 22. The method of Example Embodiment 21, wherein the RRC message comprises a RRCReconfiguration message or an RRCRelease message.

Example Embodiment 23. The method of any one of Example Embodiments 18 to 19, wherein the configuration message is received in a MAC message comprising a MAC PDU and/or a MAC CE.

Example Embodiment 24. The method of any one of Example Embodiments 18 to 19, wherein the configuration message is received in downlink control information (DCI).

Example Embodiment 25. The method of any one of Example Embodiments 1 to 24, wherein the wireless device is configured, based on a specification, to perform the steps of determining whether the at least one condition is fulfilled in response to receiving the second message and, based on the at least one condition being fulfilled, determine whether or not to take the at least one action based on the at least one parameter in response to receiving the second message.

Example Embodiment 26. The method of any one of Example Embodiments 1 to 25, wherein determining whether the at least one condition is fulfilled comprises at least one of: determining that the wireless device is allowed to take the at least one action; determining that a PUSCH resource allocation can be received in a second procedure which has a same size as a PUSCH resource allocation associated with the first procedure; determining an urgency level or latency tolerance of data to be transmitted triggers a need for taking the at least one action; determining a presence of or an arrival of new data or information in an uplink buffer of the wireless device; and determining a time to be gained from ignoring the at least one parameter and initiating a second procedure for initiating access to the network.

Example Embodiment 27. The method of Example Embodiment 27, wherein determining that the wireless device is allowed to take the at least one action is based on at least one of: a capability of the wireless device; a property of data, an application, or a service that triggered the first procedure; whether the first procedure is a prioritized random access procedure; an RRC state of the wireless device; a preamble group used for the transmission of the first message; whether the network node configured the wireless device to ignore the at least one parameter; and whether the wireless device is required to ignore the at least one parameter.

Example Embodiment 28. The method of anyone of Example Embodiments 1 to 27, wherein the at least one condition is fulfilled when the second message indicates that the wireless device is to take the at least one action.

Example Embodiment 29. The method of any one of Example Embodiments 1 to 27, wherein the at least one parameter comprises a backoff indicator, and wherein the at least one condition is fulfilled when the second message indicates that the wireless device is to ignore the backoff indicator, and wherein taking the at least one action comprises initiating a second procedure to access the network before the period of time associated with the at least one parameter expires.

Example Embodiment 30. A computer program comprising instructions which when executed on a computer perform any of the methods of Example Embodiments 1 to 29.

Example Embodiment 31. A computer program product comprising computer program, the computer program comprising instructions which when executed on a computer perform any of the methods of Example Embodiments 1 to 29.

Example Embodiment 32. A non-transitory computer readable medium storing instructions which when executed by a computer perform any of the methods of Example Embodiments 1 to 29.

Example Embodiment 33. A wireless device comprising processing circuitry configured to perform any of the methods of Example Embodiments 1 to 29.

Example Embodiment 34. A method performed by a network node, the method comprising: receiving, from a wireless device, a first message to initiate a first procedure to access a network; transmitting, to the wireless device, a second message, the second message comprising at least one parameter indicating that the wireless device is to wait a period of time before reattempting to access the network; and before an expiration of the period of time that the wireless device is to wait, receiving a third message to initiate a second procedure to access a network.

Example Embodiment 35. The method of Example Embodiment 34, wherein the first procedure to access the network comprises a 2-step RACH procedure and the second message comprises a msgB.

Example Embodiment 36. The method of any one of Example Embodiments 34 to 35, wherein the second message does not include a include an indication that the network node received a RACH preamble in a first message from the wireless device.

Example Embodiment 37. The method of any one of Example Embodiments 34 to 36, wherein the second message does not include an indication that the wireless device is to reattempt to access the network using a second procedure.

Example Embodiment 38. The method of Example Embodiment 37, wherein the first procedure is a 2-step RACH procedure and the second procedure is a 4-step RACH procedure.

Example Embodiment 39. The method of any one of Example Embodiments 34 to 38, wherein the at least one parameter comprises a backoff indicator.

Example Embodiment 40. The method of any one of Example Embodiments 34 to 39, further comprising configuring the wireless device to ignore the at least one parameter indicating that the wireless device is to wait the period of time before reattempting to access the network when at least one condition is fulfilled.

Example Embodiment 41. The method of Example Embodiment 40, wherein configuring the wireless device to ignore the at least one parameter comprises configuring the wireless device to perform at least one of: reattempt to access the network using the first procedure before the period of time associated with the at least one parameter has passed; reattempt to access the network using a second procedure that is different than the first procedure before the period of time associated with the at least one parameter has passed; skip the period of time associated with the at least one parameter and reattempting to access the network before the period of time associated with the at least one parameter has passed; and switch from the first procedure to a second procedure to attempt to access the network, wherein the first procedure is a 2-step RACH procedure and the second procedure is a 4-step procedure, and wherein a maximum number of attempts for the 2-step RACH procedure has not been exceeded.

Example Embodiment 42. The method of any one of Example Embodiments 34 to 39, further comprising configuring the wireless device to determine whether or not to take at least one action comprises in response to determining that at least one condition is fulfilled.

Example Embodiment 43. The method of Example Embodiment 42, wherein the at least one action comprises determining to and/or initiating a second procedure to access the network.

Example Embodiment 44. The method of Example Embodiment 43, wherein the second procedure comprises a 4-step RACH procedure.

Example Embodiment 45. The method of any one of Example Embodiments 42 to 44, wherein the at least one condition comprises determining or identifying a 4-step RACH occasion for performing the second procedure.

Example Embodiment 46. The method of any one of Example Embodiments 42 to 44, wherein the at least one condition comprises determining or identifying a RACH occasion that is dedicated to a 4-step RACH procedure only (i.e., cannot be used for a 2-step RACH procedure).

Example Embodiment 47. The method of any one of Example Embodiments 43 to 46, further comprising configuring the wireless device to determine or obtain a RACH occasion for transmitting a first message in the second procedure.

Example Embodiment 48. The method of Example Embodiment 47, wherein the at least one condition indicates the RACH occasion for transmitting the first message in the second procedure.

Example Embodiment 49. The method of any one of Example Embodiments 42 to 48, wherein configuring the wireless device to determine that the at least one condition is fulfilled comprises configuring the wireless device to determine that the wireless device is configured to ignore the at least one parameter.

Example Embodiment 50. The method of any one of Example Embodiments 42 to 49, wherein configuring the wireless device to determine that the at least one condition is fulfilled comprises configuring the wireless device to determine that the wireless device has reached a maximum number of failed attempts associated with the first procedure.

Example Embodiment 51. The method of Example Embodiment 50, wherein the maximum number of failed attempts is two.

Example Embodiment 52. The method of any one of Example Embodiments 34 to 51, further comprising, prior to transmitting the second message to the wireless device, transmitting a configuration message to the wireless device to configure the wireless device to: determine whether at least one condition is fulfilled in response to receiving the second message; and based on whether the at least one condition being fulfilled, determine whether or not to take at least one action.

Example Embodiment 53. The method of Example Embodiment 52, wherein the configuration message is transmitted as broadcast system information.

Example Embodiment 54. The method of Example Embodiment 52, wherein the configuration message is transmitted in an RRC message.

Example Embodiment 55. The method of Example Embodiment 54, wherein the RRC message comprises a RRCReconfiguration message or an RRCRelease message.

Example Embodiment 56. The method of Example Embodiment 52, wherein the configuration message is transmitted in a MAC message comprising a MAC PDU and/or a MAC CE.

Example Embodiment 57. The method of Example Embodiment 52, wherein the configuration message is transmitted in downlink control information (DCI).

Example Embodiment 58. The method of any one of Example Embodiments 34 to 47, wherein the wireless device is configured, based on a specification, to determine whether at least one condition is fulfilled in response to receiving the second message comprising the at least one parameter and, based on the at least one condition being fulfilled, determine whether or not to take at least one action based on the at least one parameter.

Example Embodiment 59. The method of any one of Example Embodiments 40 to 58, wherein configuring the wireless device to determine whether the at least one condition is fulfilled comprises configuring the wireless device to perform at least one of: determining that the wireless device is allowed to take the at least one action; determining that a PUSCH resource allocation can be received in a second procedure which has a same size as a PUSCH resource allocation associated with the first procedure; determining an urgency level or latency tolerance of data to be transmitted triggers a need for taking the at least one action; determining a presence of or an arrival of new data or information in an uplink buffer of the wireless device; determining a time to be gained from ignoring the at least one parameter and initiating a second procedure for initiating access to the network.

Example Embodiment 60. The method of Example Embodiment 59, wherein configuring the wireless device to determine that the wireless device is allowed to take the at least one action is based on at least one of: a capability of the wireless device; a property of data, an application, or a service that triggered the first procedure; whether the first procedure is a prioritized random access procedure; an RRC state of the wireless device; a preamble group used for the transmission of the first message; whether the network node configured the wireless device to ignore the at least one parameter; and whether the wireless device is required to ignore the at least one parameter.

Example Embodiment 61. The method of anyone of Example Embodiments 40 to 60, wherein the at least one condition is fulfilled when the second message indicates that the wireless device is to take the at least one action.

Example Embodiment 62. A computer program comprising instructions which when executed on a computer perform any of the methods of Example Embodiments 34 to 61.

Example Embodiment 63. A computer program product comprising computer program, the computer program comprising instructions which when executed on a computer perform any of the methods of Example Embodiments 34 to 61.

Example Embodiment 64. A non-transitory computer readable medium storing instructions which when executed by a computer perform any of the methods of Example Embodiments 34 to 61.

Example Embodiment 65. A network node comprising processing circuitry configured to perform any of the methods of Example Embodiments 34 to 61.

Example Embodiment 66. A wireless device comprising: processing circuitry configured to perform any of the steps of any of Example Embodiments 1 to 33; and power supply circuitry configured to supply power to the wireless device.

Example Embodiment 67. A network node comprising: processing circuitry configured to perform any of the steps of any of Example Embodiments 34 to 65; power supply circuitry configured to supply power to the wireless device.

Example Embodiment 68. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 33; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

Example Embodiment 69. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Example Embodiments 34 to 65.

Example Embodiment 70. The communication system of the pervious embodiment further including the network node.

Example Embodiment 71. The communication system of the previous 2 embodiments, further including the wireless device, wherein the wireless device is configured to communicate with the network node.

Example Embodiment 72. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 73. A method implemented in a communication system including a host computer, a network node and a wireless device, the method comprising: at the host computer, providing user data; and at the host computer, initiating a transmission carrying the user data to the wireless device via a cellular network comprising the network node, wherein the network node performs any of the steps of any of Example Embodiments 34 to 65.

Example Embodiment 74. The method of the previous embodiment, further comprising, at the network node, transmitting the user data.

Example Embodiment 75. The method of the previous 2 embodiments, wherein the user data is provided at the host computer by executing a host application, the method further comprising, at the wireless device, executing a client application associated with the host application.

Example Embodiment 76. A wireless device configured to communicate with a network node, the wireless device comprising a radio interface and processing circuitry configured to performs the of the previous 3 embodiments.

Example Embodiment 77. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of Example Embodiments 1 to 33.

Example Embodiment 78. The communication system of the previous embodiment, wherein the cellular network further includes a network node configured to communicate with the wireless device.

Example Embodiment 79. The communication system of the previous 2 embodiments, wherein: the processing circuitry of the host computer is configured to execute a host application, thereby providing the user data; and the wireless device's processing circuitry is configured to execute a client application associated with the host application.

Example Embodiment 80. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of Example Embodiments 1 to 33.

Example Embodiment 81. The method of the previous embodiment, further comprising at the wireless device, receiving the user data from the network node.

Example Embodiment 82. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of Example Embodiments 1 to 33.

Example Embodiment 83. The communication system of the previous embodiment, further including the wireless device.

Example Embodiment 84. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 85. The communication system of the previous 3 embodiments, wherein: the processing circuitry of the host computer is configured to execute a host application; and the wireless device's processing circuitry is configured to execute a client application associated with the host application, thereby providing the user data.

Example Embodiment 86. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 87. A method implemented in a communication system including a host computer, a network node and a wireless device, the method comprising: at the host computer, receiving user data transmitted to the network node from the wireless device, wherein the wireless device performs any of the steps of any of Example Embodiments 1 to 33.

Example Embodiment 88. The method of the previous embodiment, further comprising, at the wireless device, providing the user data to the network node.

Example Embodiment 89. The method of the previous 2 embodiments, further comprising: at the wireless device, executing a client application, thereby providing the user data to be transmitted; and at the host computer, executing a host application associated with the client application.

Example Embodiment 90. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 91. A communication system including a host computer comprising a communication interface configured to receive user data originating from a transmission from a wireless device to a network node, wherein the network node comprises a radio interface and processing circuitry, the network node's processing circuitry configured to perform any of the steps of any of Example Embodiments 34 to 65.

Example Embodiment 92. The communication system of the previous embodiment further including the network node.

Example Embodiment 93. The communication system of the previous 2 embodiments, further including the wireless device, wherein the wireless device is configured to communicate with the network node.

Example Embodiment 94. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 95. A method implemented in a communication system including a host computer, a network node and a wireless device, the method comprising: at the host computer, receiving, from the base station, user data originating from a transmission which the network node has received from the wireless device, wherein the wireless device performs any of the steps of any of Example Embodiments 1 to 33.

Example Embodiment 96. The method of the previous embodiment, further comprising at the network node receiving the user data from the wireless device.

Example Embodiment 97. The method of the previous 2 embodiments, further comprising at the network node, initiating a transmission of the received user data to the host computer.

Example Embodiment 98. The method of any of the previous embodiments, wherein the network node comprises a base station.

Example Embodiment 99. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A A method by a wireless device, the method comprising:

transmitting, to a network node, a first message to initiate a 2-step Random Access, RA, procedure to access a network;

after transmitting the first message, receiving, from the network node, a second message, the second message comprising at least one parameter indicating that the wireless device is to wait a period of time before reattempting to access the network using the 2-step RA procedure;

determining that the second message does not include an indication that the network received a RA preamble in the first message from the wireless device; and based on the parameter indicating that the wireless device is to wait a period of time before reattempting to access the network using the 2-step RA procedure and the second message not including the indication that the network node received a RA preamble in the first message, attempting to access the network using a 4-step RA procedure without waiting for the period of time.

2. The method of claim 1, wherein a maximum number of attempts for the 2-step RA procedure has not been exceeded when the attempt to access the network using the 4-step RA procedure is initiated.

3. The method of claim 1, wherein the second message comprises a msgB.

4. The method of claim 1, wherein the at least one parameter comprises a backoff indicator.

5. The method of claim 1, further comprising determining a RA occasion for performing the 4-step RA procedure.

6. The method of claim 1, further comprising determining that the second message indicates that the wireless device is to attempt to access the network using the 4-step RA procedure without waiting for the period of time.

7. The method of claim 1, further comprising determining that the wireless device is configured to ignore the at least one parameter.

8. The method of claim 7, wherein determining that the wireless device is configured to ignore the at least one parameter is based on at least one of:

a capability of the wireless device;

a property of data, an application, or a service that triggered the 2-step RA procedure;

whether the 2-step RA procedure is a prioritized random access procedure;

an RRC state of the wireless device;

a preamble group used for the transmission of the first message;

whether the network node configured the wireless device to ignore the at least one parameter; and whether the wireless device is required to ignore the at least one parameter.

9. A wireless device comprising:

processing circuitry configured to:

transmit, to a network node, a first message to initiate a 2-step Random Access, RA, procedure to access a network;

after transmitting the first message, receive, from the network node, a second message, the second message comprising at least one parameter indicating that the wireless device is to wait a period of time before reattempting to access the network using the 2-step RA procedure;

determine that the second message does not include an indication that the network received a RA preamble in the first message from the wireless device; and based on the parameter indicating that the wireless device is to wait a period of time before reattempting to access the network using the 2-step RA procedure and the second message not including the indication that the network node received a RA preamble in the first message, attempt to access the network using a 4-step RA procedure without waiting for the period of time.

10. The wireless device of claim 9, wherein a maximum number of attempts for the 2-step RA procedure has not been exceeded when the attempt to access the network using the 4-step RA procedure is initiated.

11. A method by a network node, the method comprising:

receiving, from a wireless device, a first message to initiate a 2-step Random Access, RA, procedure to access a network;

transmitting, to the wireless device, a second message, the second message comprising at least one parameter indicating that the wireless device is to wait a period of time before reattempting to access the network using the 2-step RA procedure, wherein the second message does not include an indication that the network node received a RA preamble in the first message from the wireless device; and before an expiration of the period of time that the wireless device is to wait, receiving a third message, from the wireless device, to initiate a 4-step RA procedure to access the network.

12. The method of claim 11, wherein a maximum number of attempts for the 2-step RA procedure has not been exceeded when the attempt to access the network using the 4-step RA procedure is initiated.

13. The method of claim 11, wherein the second message comprises a msgB.

14. The method of claim 11, wherein the at least one parameter comprises a backoff indicator.

15. The method of claim 11, further comprising configuring the wireless device to ignore the at least one parameter indicating that the wireless device is to wait the period of time before reattempting to access the network using the 2-step RA procedure when at least one condition is fulfilled.

16. The method of claim 11, wherein the second message indicates that the wireless device is to attempt to access the network using the 4-step RA procedure without waiting the period of time.

17. The method of claim 11, further comprising, prior to transmitting the second message to the wireless device, transmitting a configuration message to the wireless device to configure the wireless device to:

in response to receiving the second message, attempt to access the network using the 4-step RA procedure without waiting for the period of time.

18. A network node comprising:

processing circuitry configured to:

receive, from a wireless device, a first message to initiate a 2-step Random Access, RA, procedure to access a network;

transmit, to the wireless device, a second message, the second message comprising at least one parameter indicating that the wireless device is to wait a period of time before reattempting to access the network using the 2-step RA procedure, wherein the second message does not include an indication that the network node received a RA preamble in the first message from the wireless device; and before an expiration of the period of time that the wireless device is to wait, receive a third message, from the wireless device, to initiate a 4-step RA procedure to access the network.

19. The network node of claim 18, wherein a maximum number of attempts for the 2-step RA procedure has not been exceeded when the attempt to access the network using the 4-step RA procedure is initiated.

* * * * *